United States Patent
Myeong et al.

(10) Patent No.: US 11,475,678 B2
(45) Date of Patent: Oct. 18, 2022

(54) LANE MARKER DETECTION AND LANE INSTANCE RECOGNITION

(71) Applicant: QUALCOMM Incorporated, San Diego, CA (US)

(72) Inventors: Heesoo Myeong, Seoul (KR); Hee-Seok Lee, Yongin-si (KR); Duck Hoon Kim, Seoul (KR); Seungwoo Yoo, Yongin-si (KR); Kang Kim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/733,228

(22) Filed: Jan. 2, 2020

(65) Prior Publication Data
US 2020/0218909 A1 Jul. 9, 2020

Related U.S. Application Data

(60) Provisional application No. 62/788,756, filed on Jan. 4, 2019.

(51) Int. Cl.
*G06V 20/56* (2022.01)

(52) U.S. Cl.
CPC .................................. *G06V 20/588* (2022.01)

(58) Field of Classification Search
CPC .......... G06K 9/00791; G06K 9/00798; G06K 9/6271; G06V 20/588; G06V 10/82
See application file for complete search history.

(56) References Cited

U.S. PATENT DOCUMENTS

| | | | |
|---|---|---|---|
| 9,063,548 B1* | 6/2015 | Ferguson | B60Q 1/50 |
| 9,081,385 B1* | 7/2015 | Ferguson | G06V 20/588 |
| 9,428,187 B2 | 8/2016 | Lee | |
| 10,121,367 B2 | 11/2018 | Jammoussi et al. | |
| 2007/0255480 A1* | 11/2007 | Southall | B60T 7/22 701/96 |
| 2014/0358414 A1* | 12/2014 | Ibrahim | G08G 1/0141 701/119 |
| 2016/0176341 A1* | 6/2016 | Raghu | B60W 30/18163 348/148 |
| 2016/0366721 A1 | 12/2016 | Song et al. | |
| 2017/0267177 A1* | 9/2017 | Nariyambut Murali | G08G 1/167 |
| 2017/0316684 A1* | 11/2017 | Jammoussi | G08G 1/096716 |

(Continued)

FOREIGN PATENT DOCUMENTS

WO WO-2018172347 A1 9/2018

OTHER PUBLICATIONS

Chougule S., et al., "Reliable multilane detection and classi cation by utilizing CNN as a regression network", Munich, Germany, Sep. 8-14, 2018, Proceedings, Part V. 10.1007/978-3-030-11021-5_46, 14 pages.

(Continued)

*Primary Examiner* — M D K Talukder
(74) *Attorney, Agent, or Firm* — Muncy, Geissler, Olds & Lowe, P.C.

(57) ABSTRACT

Disclosed are techniques for performing lane instance recognition. Lane instances are difficult to recognize since they are long and elongated, and they also look different from view to view. An approach is proposed in which local mask segmentation lane estimation and global control points lane estimation are combined.

30 Claims, 18 Drawing Sheets

(56) References Cited

U.S. PATENT DOCUMENTS

| | | | |
|---|---|---|---|
| 2018/0189577 A1 | 7/2018 | Yoo et al. | |
| 2018/0189578 A1* | 7/2018 | Yang | G01C 21/32 |
| 2019/0103026 A1 | 4/2019 | Liu et al. | |
| 2019/0239189 A1 | 8/2019 | Hwang et al. | |
| 2019/0251372 A1 | 8/2019 | Dwivedi et al. | |
| 2019/0254110 A1 | 8/2019 | He et al. | |
| 2019/0266418 A1* | 8/2019 | Xu | G06V 10/457 |
| 2020/0092814 A1 | 3/2020 | Zhou et al. | |
| 2020/0107267 A1 | 4/2020 | Wu et al. | |
| 2020/0218909 A1* | 7/2020 | Myeong | G06V 10/82 |
| 2020/0221408 A1 | 7/2020 | Lee | |
| 2020/0250440 A1* | 8/2020 | Campos | G06V 10/82 |
| 2020/0260382 A1 | 8/2020 | Ljung et al. | |
| 2020/0396687 A1 | 12/2020 | Hwang et al. | |
| 2021/0068010 A1 | 3/2021 | Xu et al. | |
| 2021/0105719 A1 | 4/2021 | Thangarasa et al. | |

OTHER PUBLICATIONS

"3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2, (Release 15)", 3GPP Draft, Draft 36300-F40, 3rd Generation Partnership Project (3GPP), Mobile Competence Centre, 650, Route Des Lucioles, F-06921, Sophia-Antipolis Cedex, France, Dec. 28, 2018 (Dec. 28, 2018), XP051576805, 362 pages, Retrieved from the Internet: URL: http://www.3gpp.org/ftp/tsg%5Fran/WG2%5FRL2/Specifications/201812%5Fdraft%5Fspecs%5Fafter%5FRAN%5F82/Draft%5F36300%2Df40%2Ezip. [retrieved on Dec. 28, 2018] paragraphs [04.4], [5.1.4], [5.1.4a] paragraphs [5. 1. 10], [5. 1. 11] paragraph [10.1.4]—paragraph [10.1.9.5].

"3rd Generation Partnership Project, Technical Specification Group Radio Access Network, Evolved Universal Terrestrial Radio Access (E-UTRA), Radio Resource Control (RRC), Protocol specification (Release 15)", 3GPP Draft, 36331-F30, 3rd Generation Partnership Project (3GPP), Mobile Competence Center, 650, Route Lucioles, F-06921, Sophia-Antipolis Cedex, France, Oct. 1, 2018 (Oct. 1, 2018), XP051519475, 918 pages, Retrieved from the Internet: URL: http://www.3gpp.org/ftp/tsg%5FranfWG2%5FRL2/Specifications/201809%5Ffinal%5Fspecs%5Fafter%5FRAN%5F81/36331%2Df30%2Ezip. [retrieved on Oct. 1, 2018] paragraphs [5.3.2.1], [5.3.2.3] paragraph [5.3.17]—paragraph [5.3.17.2] paragraphs [6.3.6], [6.7.3.2].

Mediatek Inc: "UE Group Wake-up Signal in NB-IOT", 3GPP Draft, R2-1816956 UE-Group WUS in NB-IOT, 3rd Generation Partnership Project (3GPP), Mobile Competence Center, 650, Route Lucioles, F-06921, Sophia-Antipolis Cedex, France, vol. RAN WG2, No. Spokane, WA, USA, Nov. 12, 2018-Nov. 16, 2018, Nov. 2, 2018 (Nov. 2, 2018), XP051480895, 5 pages, Retrieved from the Internet: URL: http://www.3gpp.org/ftp/tsg%5Fran/WG2%5FRL2/TSGR2%5F104/Docs/R2%2D1816956%2Ezip. [retrieved on Nov. 2, 2018] paragraph [002.].

Mediatek Inc: "UE Behaviour of WUS Monitoring," 3GPP TSG-RAN WG2 Meeting #103, R2-1811177, Aug. 20-24, 2018, 5 pages.

Qualcomm Incorporated: "Report of Email Discussion to Progress Open Issues on WUS," 3GPP TSG RAN WG2 #102, Tdoc R2-1807097, May 21-25, 2018, pp. 1-17.

Qualcomm Incorporated: "Views on UE Power Saving," 3GPP Draft, 3GPP TSG RAN WG1 Meeting #94, R1-1809462 Views on UE Power Saving, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 17, 2018, XP051516827, 12 Pages, Retrieved from the Internet: URL: http://www.3gpp.org/ftp/tsg%5Fran/WG1%5FRL1/TSGR1%5F94/Docs/R1%2D1809462%2Ezip [retrieved on Aug. 17, 2018].

* cited by examiner

LANE MARKER DETECTION AND LANE INSTANCE RECOGNITION

CROSS-REFERENCE TO RELATED APPLICATION

The present Application for Patent claims the benefit of U.S. Provisional Patent Application No. 62/788,756 entitled "LANE MARKER DETECTION AND LANE INSTANCE RECOGNITION," filed Jan. 4, 2019, assigned to the assignee hereof, and expressly incorporated herein by reference in its entirety.

TECHNICAL FIELD

Aspects of this disclosure relate generally to neural network based lane marker detection (LIVID) using parametric curve regression. Aspects of this disclosure also relate generally to lane instance recognition by object detection.

BACKGROUND

Modern motor vehicles are increasingly incorporating technology that helps drivers avoid drifting into adjacent lanes or making unsafe lane changes (e.g., Lane Departure Warning (LDW)), or that warns drivers of other vehicles behind them when they are backing up, or that brakes automatically if a vehicle ahead of them stops or slows suddenly (e.g., Forward Collision Warning (FCW)), among other things. The continuing evolution of automotive technology aims to deliver even greater safety benefits, and ultimately deliver Automated Driving Systems (ADS) that can handle the entire task of driving without the need for user intervention.

There are six levels that have been defined to achieve full automation. At Level 0, the human driver does all the driving. At Level 1, an Advanced Driver Assistance System (ADAS) on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human need not pay attention in those circumstances. At Level 5, an ADS on the vehicle can do all the driving in all circumstances. The human occupants are just passengers and need never be involved in driving.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method is disclosed. The method may comprise estimating one or more first lane boundaries of a first camera frame based on a first lane estimation process. The method may also comprise estimating one or more second lane boundaries of a second camera frame based on a second estimation process. The method may further comprise estimating one or more lanes based on the one or more first lane boundaries and the one or more second lane boundaries.

In an aspect, an apparatus is disclosed. The apparatus may comprise a memory and a processor communicatively coupled to the memory. The memory and/or the processor may be configured to estimate one or more first lane boundaries of a first camera frame based on a first lane estimation process. The memory and/or the processor may also be configured to estimate one or more second lane boundaries of a second camera frame based on a second estimation process. The memory and/or the processor may further be configured to estimate one or more lanes based on the one or more first lane boundaries and the one or more second lane boundaries.

In an aspect, another apparatus is disclosed. The apparatus may comprise means for estimating one or more first lane boundaries of a first camera frame based on a first lane estimation process. The apparatus may also comprise means for estimating one or more second lane boundaries of a second camera frame based on a second estimation process. The apparatus may further comprise means for estimating one or more lanes based on the one or more first lane boundaries and the one or more second lane boundaries.

In an aspect, a non-transitory computer-readable medium storing computer-executable instructions for an apparatus is disclosed. The computer-executable instructions may comprise one or more instructions causing the apparatus to estimate one or more first lane boundaries of a first camera frame based on a first lane estimation process. The computer-executable instructions may also comprise one or more instructions causing the apparatus to estimate one or more second lane boundaries of a second camera frame based on a second estimation process. The computer-executable instructions may further comprise one or more instructions causing the apparatus to estimate one or more lanes based on the one or more first lane boundaries and the one or more second lane boundaries.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
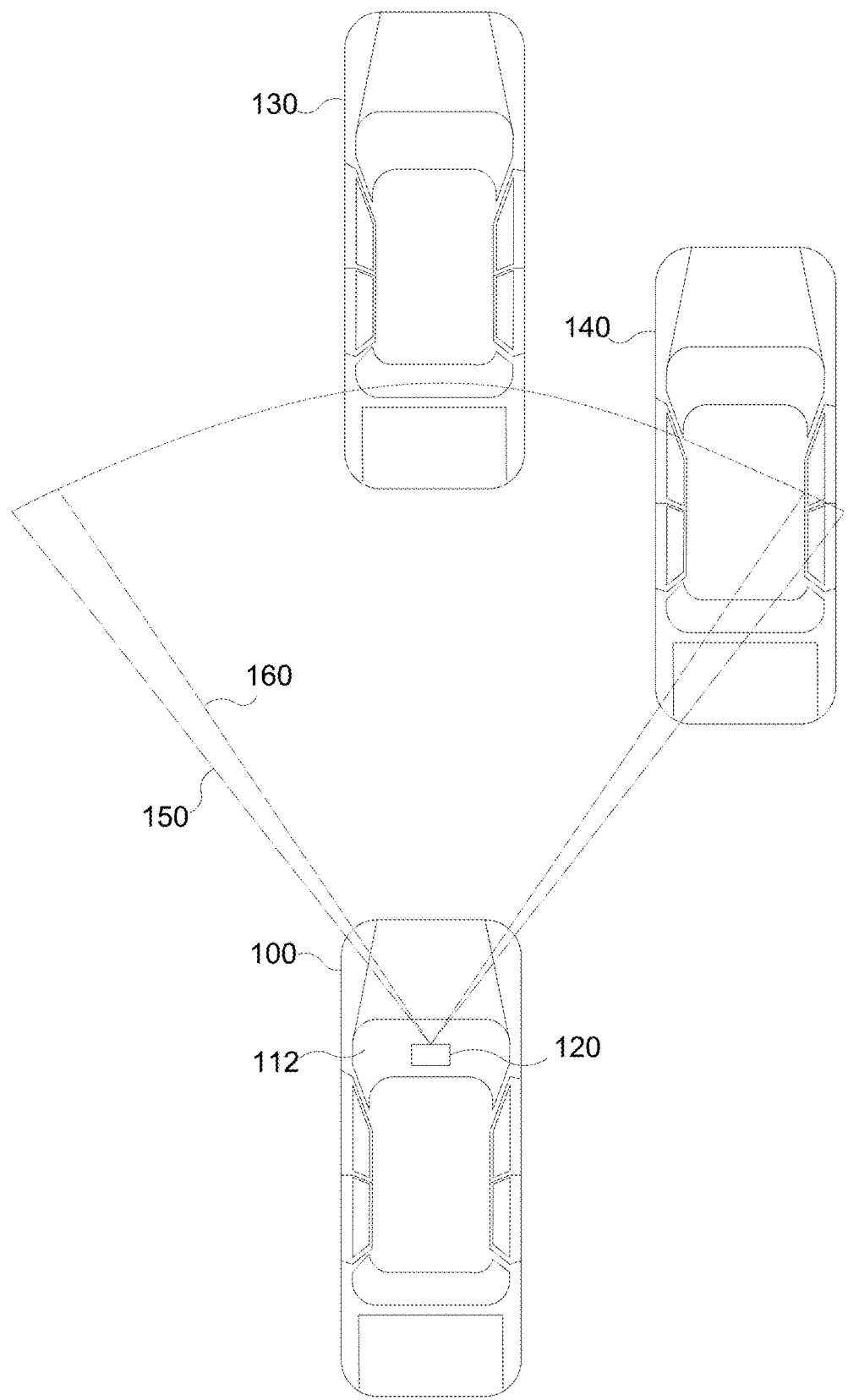
FIG. 1 is a top view of a vehicle employing an integrated radar-camera sensor behind the windshield, according to various aspects of the disclosure.

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Autonomous and semi-autonomous driving safety technologies use a combination of hardware (sensors, cameras, and radar) and software to help vehicles identify certain safety risks so they can warn the driver to act (in the case of an ADAS), or act themselves (in the case of an ADS), to avoid a crash. A vehicle outfitted with an ADAS or ADS includes one or more camera sensors mounted on the vehicle that capture images of the scene in front of the vehicle, and also possibly behind and to the sides of the vehicle. Radar systems may also be used to detect objects along the road of travel, and also possibly behind and to the sides of the vehicle. Radar systems utilize radio frequency (RF) waves to determine the range, direction, speed, and/or altitude of the objects along the road. More specifically, a transmitter transmits pulses of RF waves that bounce off any object(s) in their path. The pulses reflected off the object(s) return a small part of the RF waves' energy to a receiver, which is typically located at the same location as the transmitter. The camera and radar are typically oriented to capture their respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

To further enhance ADAS and ADS systems, especially at Level 3 and beyond, autonomous and semi-autonomous vehicles may utilize high definition (HD) map datasets, which contain significantly more detailed information and true-ground-absolute accuracy than those found in current conventional resources. Such HD maps may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by autonomous/semi-autonomous vehicles. HD maps may also provide electronic horizon predictive awareness, which enables autonomous/semi-autonomous vehicles to know what lies ahead.

Referring now to FIG. 1, a vehicle 100 (e.g., an ego-vehicle) is illustrated that includes a radar-camera sensor module 120 located in the interior compartment of the vehicle 100 behind the windshield 112. The radar-camera sensor module 120 includes a radar sensor component configured to transmit radar signals through the windshield 112 in a horizontal coverage zone 150 (shown by dashed lines), and receive reflected radar signals that are reflected off of any objects within the coverage zone 150. The radar-camera sensor module 120 further includes a camera component for capturing images based on light waves that are seen and captured through the windshield 112 in a horizontal coverage zone 160 (shown by dashed lines).

Although FIG. 1 illustrates an example in which the radar sensor component and the camera component are collocated components in a shared housing, as will be appreciated, they may be separately housed in different locations within the vehicle 100. For example, the camera may be located as shown in FIG. 1, and the radar sensor may be located in the grill or front bumper of the vehicle 100. Additionally, although FIG. 1 illustrates the radar-camera sensor module 120 located behind the windshield 112, it may instead be located in a rooftop sensor array, or elsewhere. Further, although FIG. 1 illustrates only a single radar-camera sensor module 120, as will be appreciated, the vehicle 100 may have multiple radar-camera sensor modules 120 pointed in different directions (to the sides, the front, the rear, etc.). The various radar-camera sensor modules 120 may be under the "skin" of the vehicle (e.g., behind the windshield 112, door panels, bumpers, grills, etc.) or within a rooftop sensor array.

The radar-camera sensor module 120 may detect one or more (or none) objects relative to the vehicle 100. In the example of FIG. 1, there are two objects, vehicles 130 and 140, within the horizontal coverage zones 150 and 160 that the radar-camera sensor module 120 can detect. The radar-camera sensor module 120 may estimate parameters of the detected object(s), such as the position, range, direction, speed, size, classification (e.g., vehicle, pedestrian, road sign, etc.), and the like. The radar-camera sensor module 120 may be employed onboard the vehicle 100 for automotive safety applications, such as adaptive cruise control (ACC), forward collision warning (FCW), collision mitigation or avoidance via autonomous braking, lane departure warning (LDW), and the like.

Collocating the camera and radar sensor permits these components to share electronics and signal processing, and in particular, enables early radar-camera data fusion. For example, the radar sensor and camera may be integrated onto a single board. A joint radar-camera alignment technique may be employed to align both the radar sensor and the camera. However, collocation of the radar sensor and camera is not required to practice the techniques described herein.

Figure 2:
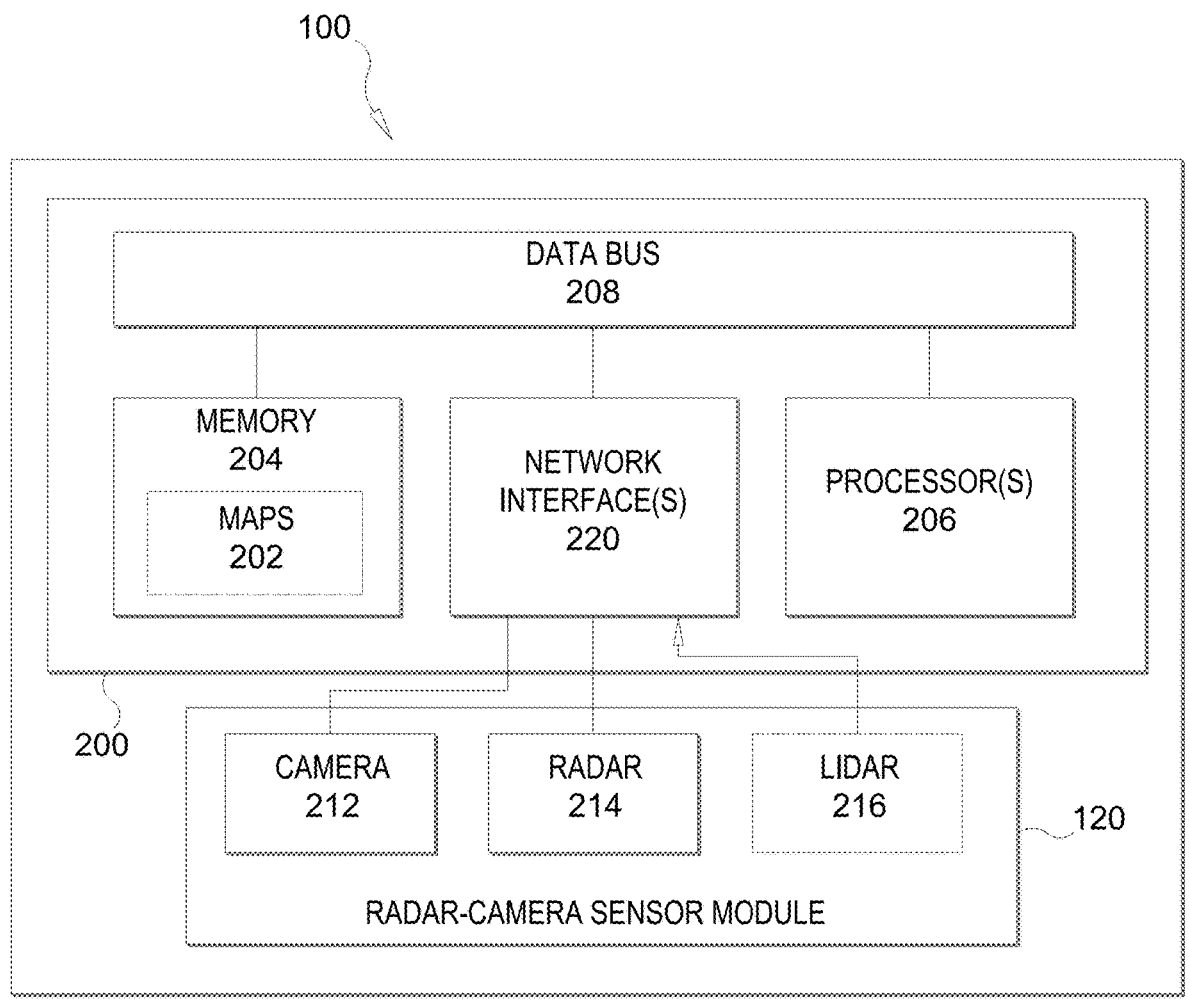
FIG. 2 illustrates an on-board computer architecture, according to various aspects of the disclosure.

FIG. 2 illustrates an on-board computer (OBC) 200 of a vehicle 100, according to various aspects. In an aspect, the OBC 200 may be part of an ADAS or ADS. The OBC 200 includes a non-transitory computer-readable storage medium, i.e., memory 204, and one or more processors 206 in communication with the memory 204 via a data bus 208. The memory 204 includes one or more storage modules storing computer-readable instructions executable by the processor(s) 206 to perform the functions of the OBC 200 described herein.

One or more radar-camera sensor modules 120 are coupled to the OBC 200 (only one is shown in FIG. 2 for simplicity). In some aspects, the radar-camera sensor module 120 includes at least one camera 212, at least one radar sensor 214, and an optional Light Detection and Ranging (LiDAR) sensor 216. The OBC 200 also includes one or more network interfaces 220 connecting the processor(s) 206, by way of the data bus 208, to the radar-camera sensor module 120, other vehicle sub-systems (not shown), and in some cases, wireless communication networks (not shown), such as wireless local area networks (WLANs), global positioning systems (GPS) networks, cellular telecommunication networks, and the like.

In an aspect, the OBC 200 may utilize the network interfaces 220 to download one or more maps 202 that can then be stored in memory 204 and used for vehicle navigation. Map(s) 202 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by vehicle 100. Map(s) 202 may also provide electronic horizon predictive awareness, which enables the vehicle 100 to know what lies ahead.

In an aspect, the camera 212 may capture image frames (also referred to herein as camera frames) of the scene within the viewing area of the camera 212 (as illustrated in FIG. 1 as horizontal coverage zone 160) at some periodic rate. Likewise, the radar sensor 214 may capture radar frames of the scene within the viewing area of the radar sensor 214 (as illustrated in FIG. 1 as horizontal coverage zone 150) at some periodic rate. The periodic rates at which the camera 212 and the radar sensor 214 capture their respective frames may be the same or different. Each camera and radar frame may be timestamped. Thus, where the periodic rates are different, the timestamps can be used to select simultaneously, or nearly simultaneously, captured camera and radar frames for further processing (e.g., fusion).

Figure 3:
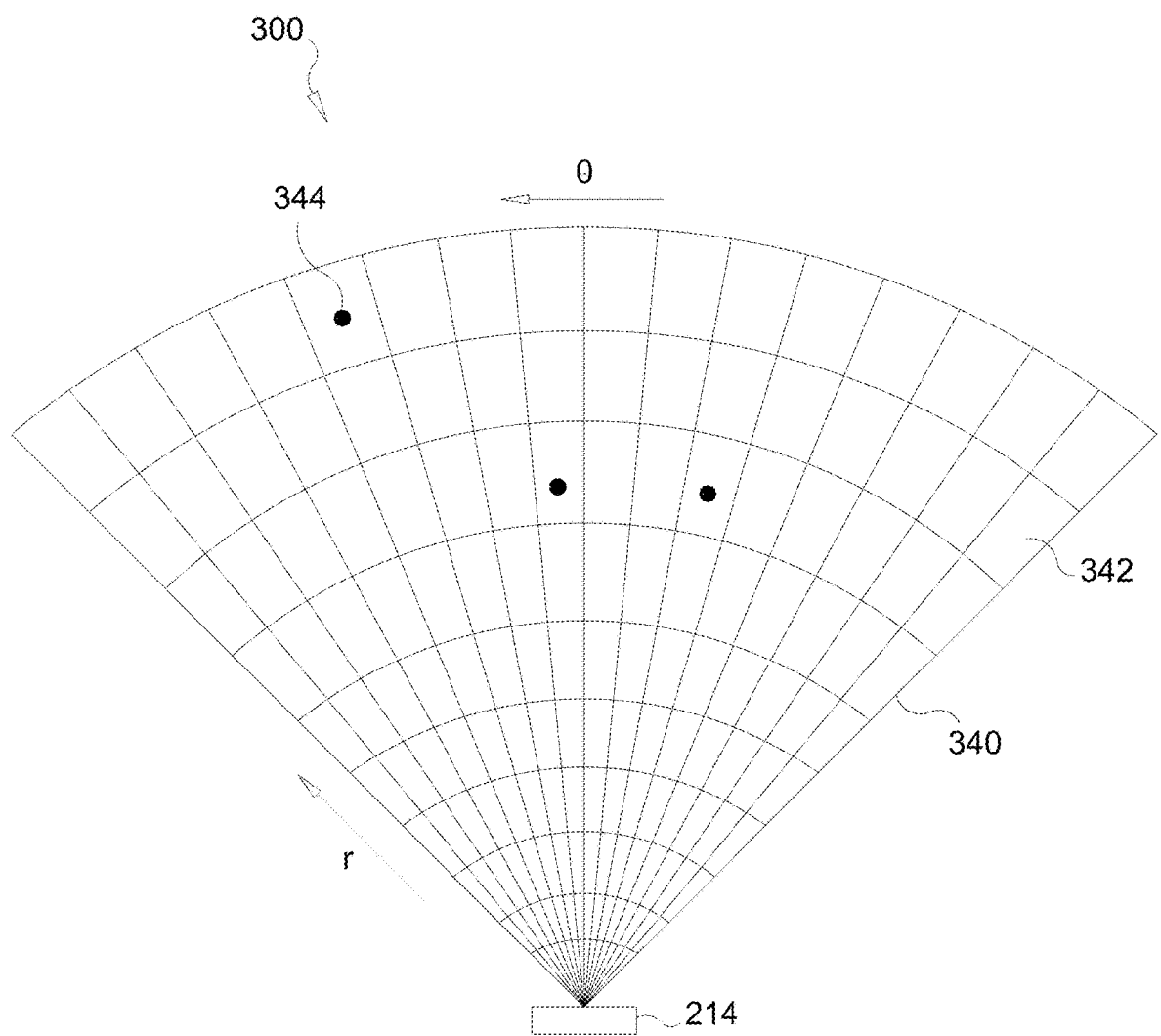
FIG. 3 is a schematic of a sensed occupancy radar grid, according to various aspects of the disclosure.

FIG. 3 illustrates a sensed occupancy radar grid 300. A transmitter (e.g., an array of transmit antennas) of the radar sensor 214 generates an electromagnetic field in the direction the transmitter is pointing (e.g., horizontal coverage zone 150). More specifically, the transmitter transmits pulses of RF waves that reflect off object(s) in the transmission path of the RF waves, such as vehicles 130 and 140 in FIG. 1. A portion of the RF waves that are reflected off the object(s) are returned to a receiver (e.g., an array of receive antennas) of the radar sensor 214, which is usually located at the same site as the transmitter of the radar sensor 214.

In an aspect, the radar sensor 214 may be an imaging radar sensor that uses beamforming to scan horizontally and vertically. Beamforming is a technique used to aim the effective direction of a radar beam by changing the delay between different transmitting antennas so that the signals add constructively in a specified direction. Thus, the radar sensor 214 may scan horizontally and vertically across the sensing area (e.g., horizontal coverage zone 150) by using a transmitter comprising an array of electronically steered antennas.

The electromagnetic field generated by the radar sensor 214 is characterized as an occupancy grid 340 having a plurality of observation cells 342. Features 344 are extracted from the cells 342 to determine whether the feature 344 is an object (e.g., a vehicle 130/140). Each feature 344 within a respective cell 342 can be identified as having up to four parameters: range, Doppler, azimuth, and elevation. As an example, a feature 344 within a cell 342 may be the signal-to-noise ratio (SNR) computed by a constant false alarm rate (CFAR) algorithm. However, it should be understood that other methods may be used to target and identify features 344 within a cell 342.

The processor(s) 206 generate four dimensional (4D) tensors for features 344 within cells 342 of the occupancy grid 340 detected by the radar sensor 214. The generated tensors represent the range (distance from the vehicle 100 to the detected feature 344), azimuth (the horizontal distance between a feature 344 and a reference RF ray emitted by the radar sensor 214, such as the initial RF ray of a radar sweep), Doppler (indicating the speed of the detected feature 344), and elevation (vertical direction from the radar sensor 214 to the detected feature) of each detected feature 344. The processor(s) 206 then performs object detection, object classification, localization, and property estimation based on the tensors and undistorted camera frames received from the camera 212.

Figure 4:
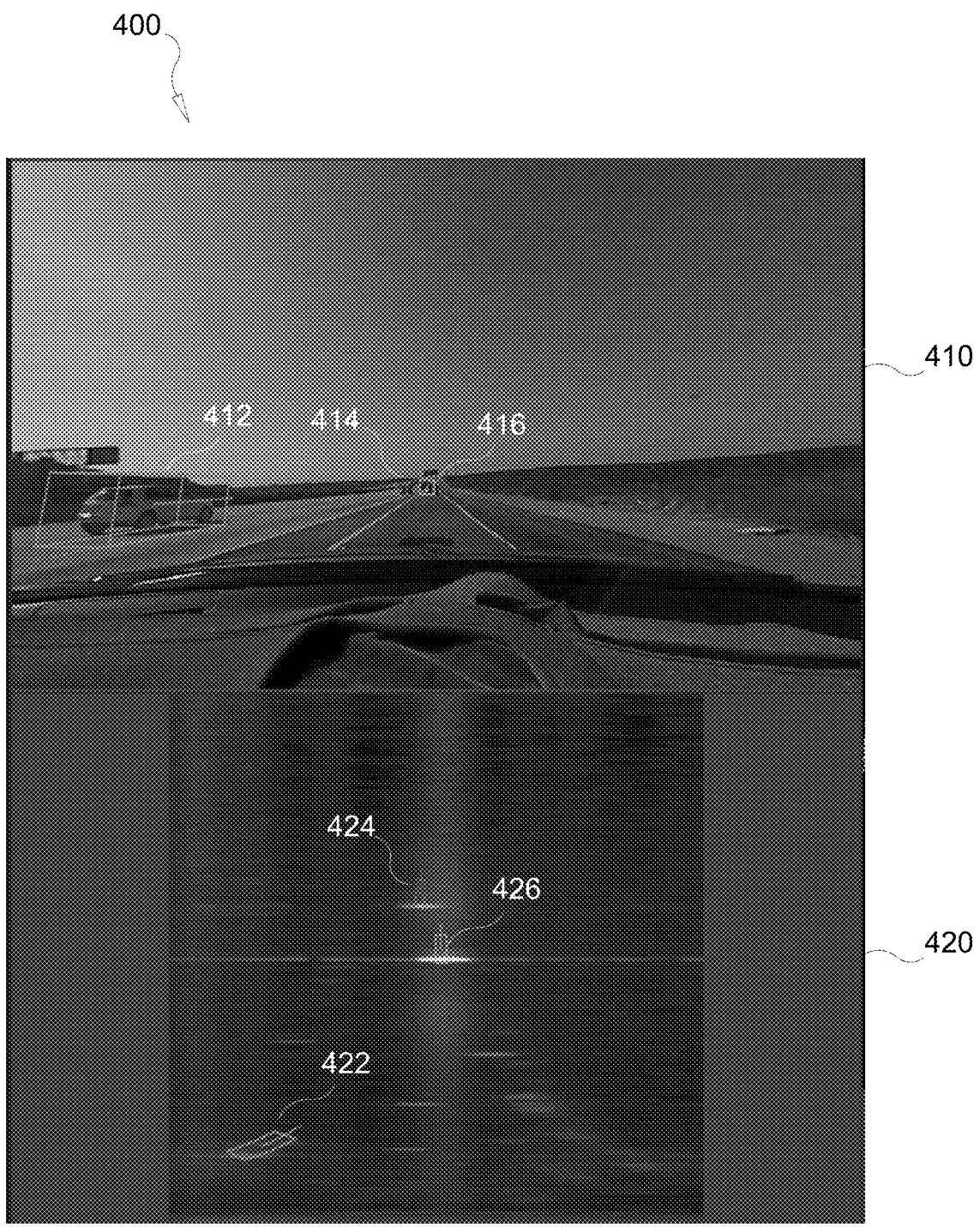
FIG. 4 illustrates a comparison between an exemplary camera frame and exemplary radar frame, according to various aspects of the disclosure.

FIG. 4 illustrates a pair 400 of a camera image 410 and a radar image 420 of the same scene. The camera image 410 may have been captured by the camera 212, and the radar image 420 may have been captured by the radar sensor 214. The camera 212 captures raw camera frames of the scene within the viewing area of the camera 212 (as illustrated in FIG. 1 as horizontal coverage zone 160). The processor(s) 206 correct any distortion in the raw camera frames to generate undistorted camera frames that are used for processing with the radar tensors. The camera image 410 is an example of an undistorted camera frame. Note that the terms "frame" and "image" are used interchangeably herein.

The radar image 420 is captured and processed as discussed above with respect to FIG. 3. The camera image 410 and the radar image 420 are then processed to identify objects within the respective images. Object detection in radar images was discussed above with respect to FIG. 3. Object detection in camera images is well-known in the art and is therefore not further described here for the sake of brevity. Any object detection methods and/or techniques may be used to detect objects in the camera images.

The results of the object detection are various attributes of the detected object(s), including bounding boxes in Cartesian x-y(-z) coordinates that tightly enclose the object(s). In the camera image 410, three objects have been detected, each surrounded by a bounding box 412, 414, and 416. In the radar image 420, the same three objects have been detected and are surrounded by bounding boxes 422, 424, and 426. As can be seen in FIG. 4, the shapes of the objects/bounding boxes 422, 424, and 426 in the radar image 420 are different sizes and shapes based on their distance from the radar sensor (e.g., radar sensor 214). For example, the bounding boxes associated with the closer objects (bounding box 422) are larger than the bounding boxes associated with farther objects (bounding boxes 424 and 426) due to reception at the radar sensor 214 of fewer reflected radio waves due to the greater distance between the radar sensor 214 and the further objects.

Once one or more objects (or none) have been identified in the camera image 410, the processor(s) 206 may use pattern-recognition and/or object recognition algorithms to classify the object(s) as road signs, traffic barrels, cars, trucks, motorcycles, bicyclists, and pedestrians. The fine pixel resolution of an image enables precise angular localization of recognized objects. Range may be estimated from stereo disparity if two cameras are used. Otherwise, a monocular system can estimate range from expected object size or displacement from the horizon. Object classification for radar images is more difficult, and often relies on correlating the object(s) detected in the radar image (e.g., radar image 420) to the object(s) detected in the corresponding (i.e., simultaneously, or nearly simultaneously, captured) camera image (e.g., camera image 410).

More specifically, the radar sensor 214 provides reasonably accurate measurements of object distance and velocity in various weather conditions. However, radar systems typically have insufficient resolution to identify features of the detected objects. The camera 212, however, may provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

Further, recent advances in machine-learning techniques have made object-classification systems for both camera images and radar images much more effective. For example, deep neural networks (mathematical functions with many layers of nodes that resemble the connectivity of brain neurons) are now practical to train due to recently developed algorithms and the availability of "big data" image sets. The heavy mathematics can now be applied to every pixel in a video/radar stream in real time due to miniature supercomputers comprised of inexpensive graphics processing units (GPUs).

Figure 5:
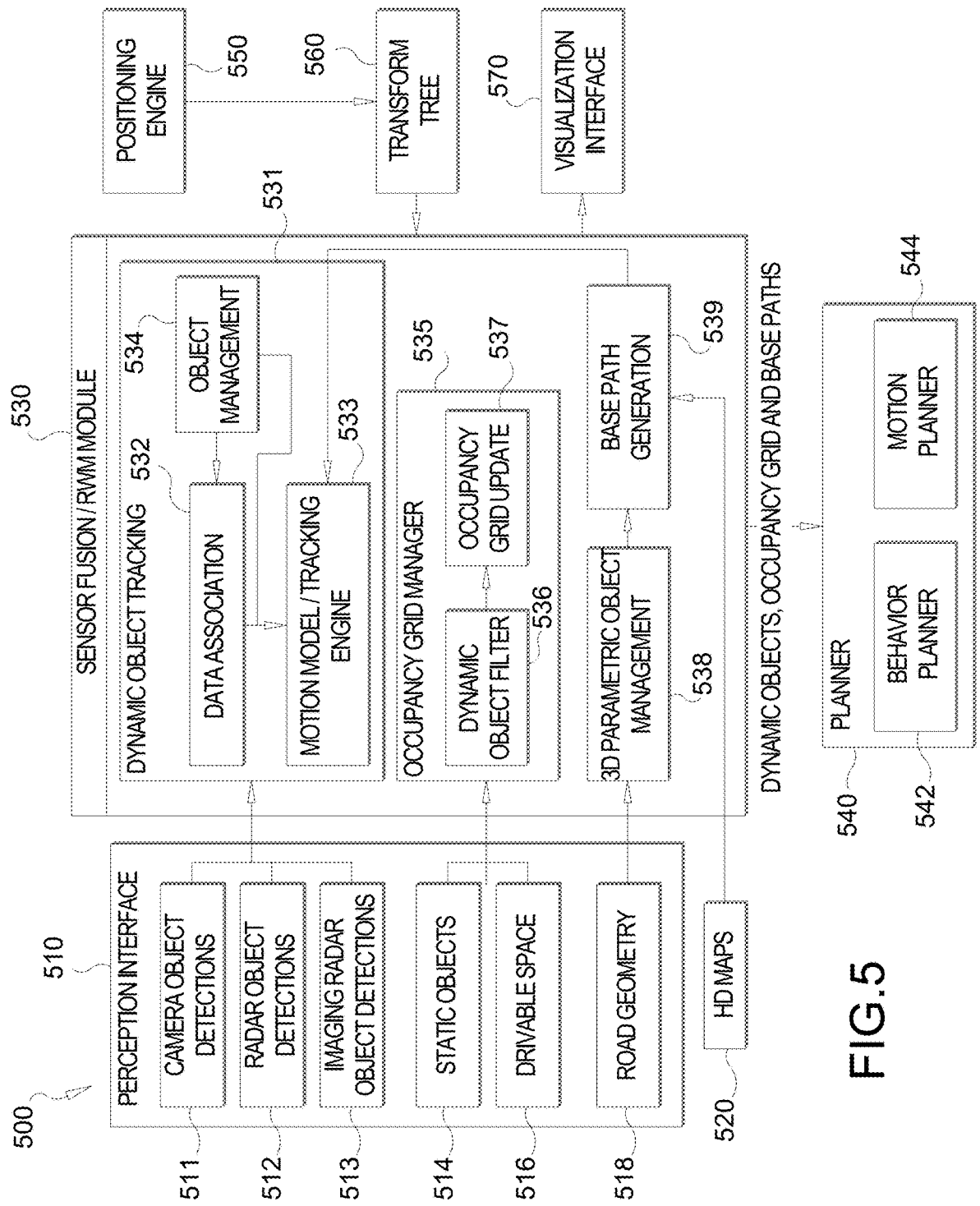
FIG. 5 illustrates an exemplary sensor fusion architecture, according to aspects of the disclosure.

FIG. 5 illustrates an exemplary sensor fusion architecture 500, according to aspects of the disclosure. In an aspect, the sensor fusion architecture 500 may be implemented by the radar-camera sensor module 120 and/or the OBC 200 of FIG. 2. A perception interface 510 of the sensor fusion architecture 500 provides inputs to a sensor fusion/real world model (RWM) module 530. In the example of FIG. 5, the perception interface 510 includes camera object detections 511 (e.g., detected based on data from the camera 212), optional radar object detections 512 (e.g., detected based on data from the optional LiDAR sensor 216), and imaging radar object detections 513 (e.g., detected based on data from the radar sensor 214). The perception interface 510 also includes information about static objects 514, drivable space 516, and road geometry 518. The information about static objects may be bounding box information, the same as for vehicles. Information about drivable space may include a per pixel label indicating whether that pixel is drivable or not. The information about road geometry may be a spline representation of the lane boundaries.

In the example of FIG. 5, the sensor fusion/RWM module 530 of the sensor fusion architecture 500 includes a dynamic object tracking module 531 that includes a data association module 532, a motion model/tracking engine 533, and an object management module 534. The data association module 532 identifies which target vehicle(s) in previous camera/radar frames are matched to currently detected vehicle(s) and associates them with each other across the camera/radar frames. The dynamic object tracking module 531 receives the camera object detections 511, optional radar object detections 512, and imaging radar object detections 513 from the perception interface 510 and generates dynamic object detections (e.g., detections of moving objects, including their path, speed, rotation, etc.). The sensor fusion/RWM module 530 also includes an occupancy grid manager module 535 that includes a dynamic object filter module 536 and an occupancy grid update module 537. The occupancy grid manager module 535 receives the information about the static objects 514 and the drivable space 516 from the perception interface 510 and the occupancy grid update module 537 updates the occupancy grid information (e.g., which grid boxes are occupied and which are open). Finally, the sensor fusion/RWM module 530 includes a 3D parametric object management module 538 and a base path generation module 539 that receive as input information about the road geometry 518 and HD maps 520 (e.g., map(s) 202), respectively, and outputs base paths (e.g., the center-of-the-lane path that the host vehicle and/or nearby vehicles are expected to follow).

The sensor fusion architecture 500 also includes a positioning engine 550 (e.g., a GPS, motion sensors (e.g., accelerometer, gyroscope, etc.), etc.) and a transform tree module 560 that provide further inputs to the sensor fusion/RWM module 530.

The sensor fusion/RWM module 530 outputs the dynamic object detections, occupancy grid, and base paths to a planner module 540 of the sensor fusion architecture 500. The planner module 540 includes a behavior planner module 542 and a motion planner module 544 that direct other systems (e.g., braking, accelerations, steering, cruise control, signaling, etc.) of the host vehicle (e.g., vehicle 100 of FIGS. 1 and 2) to act (e.g., brake, accelerate, change lanes, etc.) based on the information about the dynamic objects, the occupancy grid, and the base paths received from the sensor fusion/RWM module 530. The sensor fusion/RWM module 530 also outputs to a visualization interface 570. The visualization interface 570 may be connected to a display (e.g., light emitting diode (LED) display, liquid crystal display (LCD), etc., not shown) within the host vehicle (e.g., vehicle 100), such as on the dashboard or behind the steering wheel, to provide information to a driver or occupant within the vehicle.

Although the sensor fusion architecture 500 shown in FIG. 5 is primarily directed to reacting to events (e.g., other vehicles changing lanes, turning onto the roadway, braking, etc.) that may occur while the vehicle is driving, as will be appreciated, the sensor fusion architecture 500 may also receive input from a driver of the vehicle (e.g., direction to change lanes, turn, etc.) and act on those instructions based on the information generated by the sensor fusion/RWM module 530. For example, in the case of an instruction to change lanes, the sensor fusion architecture 500 may first determine that there is a lane to change into and that there are no vehicles in it before the planner module 540 directs the vehicle to change lanes as instructed.

Figure 6:
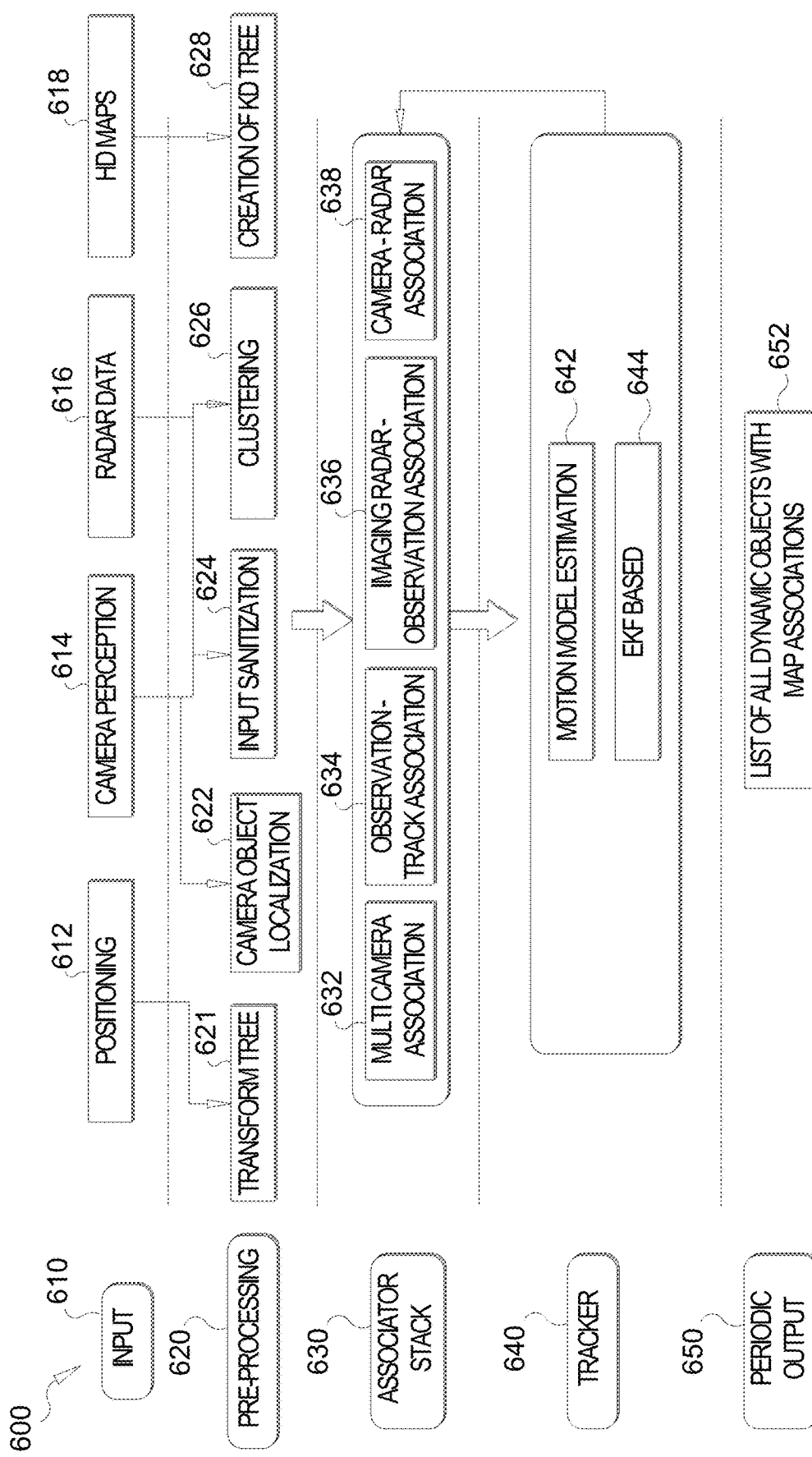
FIG. 6 illustrates an exemplary object tracking architecture, according to aspects of the disclosure.

FIG. 6 illustrates an exemplary object tracking architecture 600, according to aspects of the disclosure. In an aspect, the object tracking architecture 600 may be implemented by the radar-camera sensor module 120 and/or the OBC 200 of FIG. 2, and more specifically, the dynamic object tracking module 531 of the sensor fusion/RWM module 530 in FIG. 5. At an input stage 610, the object tracking architecture 600 receives as input positioning information 612 (e.g., GPS information), camera perception information 614 (e.g., camera images from camera 212), radar data 616 (e.g., radar frames from radar sensor 214), and HD maps 618 (e.g., HD maps 520 of FIG. 5).

At a pre-processing stage 620, the object tracking architecture 600 creates a transform tree 621 (a binary tree representation of multiple coordinate frames as nodes, and links storing the transformation matrix to move from one coordinate frame to another) from the positioning information 612. The pre-processing stage 620 performs camera object localization 622, input sanitization 624, and clustering 626 operations on the camera perception information 614 and radar data 616. The pre-processing stage 620 uses the HD maps 618 for creation of a k-D tree 628 (a space-partitioning data structure for organizing points in a k-dimensional space).

At an associator stack stage 630, the object tracking architecture 600 generates multi camera associations 632, observation track associations 634, imaging radar observation associations 636, and camera radar associations 638. At a tracker stage 640, the object tracking architecture 600 performs motion model estimation 642 and an extended Kalman filter (EKF) based 644 solution (discussed further below). Finally, at a periodic output stage 650, the object tracking architecture 600 outputs a list of all dynamic objects with respective map associations 652. This information is then fed to the planner module 540 in FIG. 5.

Figure 7:
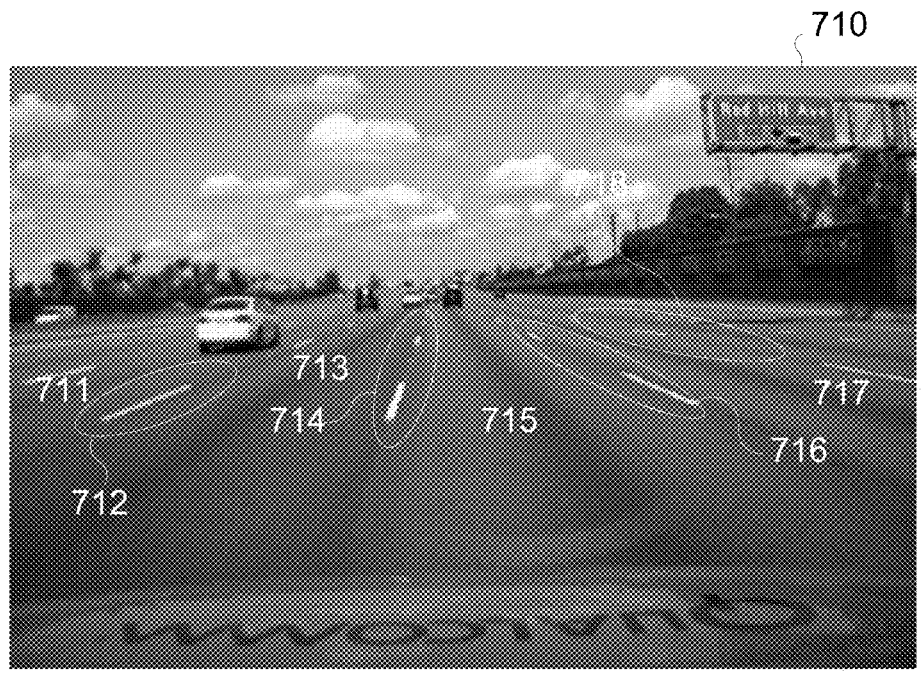
FIG. 7 illustrates an output goal of lane marker segmentation, according to aspects of the disclosure.
Figure 7:
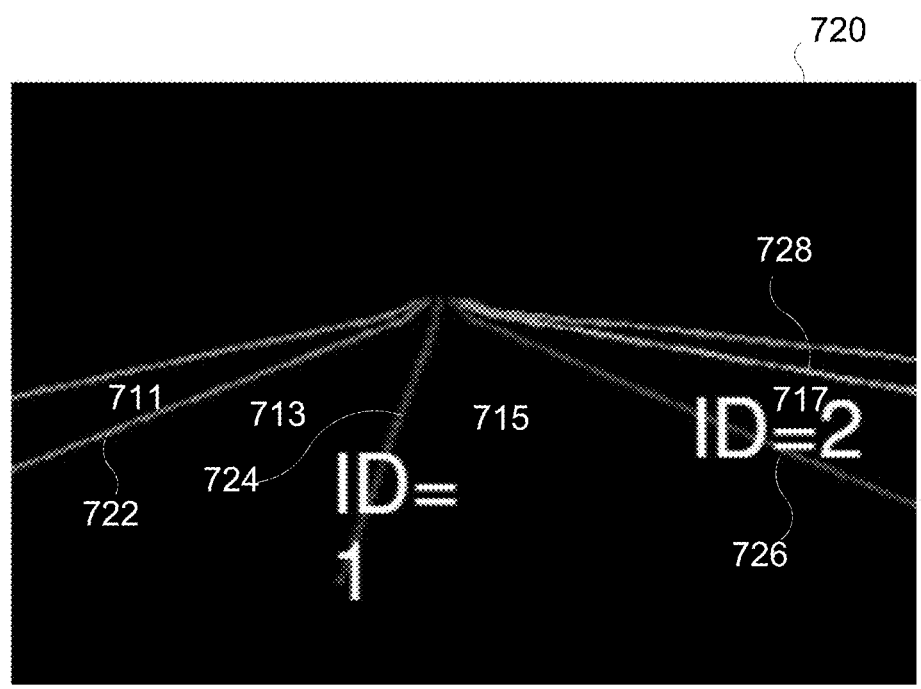

One or more aspects of this disclosure relate to neural network based lane marker detection (LIVID) using parametric curve regression. One of the goals for autonomous driving is to perform lane marker (LM) segmentation, i.e., recognize lane instances. FIG. 7 illustrates this goal in which a segmentation output 720 results from an input image 710 (e.g., a monocular camera frame). A goal is to estimate both ID and curved boundary of LM instances. As seen in FIG. 7, lane markers 712, 714, 716, 718 may be detected, recognized, or otherwise determined as being instances of lane markers that define lane boundaries 722, 724, 726, 728. To state it another way, lane boundaries may be defined by clusters of lane markers in a line.

As seen, adjacent lane boundaries may define lanes. For example, lane 713 may be defined by lane boundaries 722, 724; lane 715 may be defined by lane boundaries 724, 726; and lane 717 may be defined by lane boundaries 726, 728. It is also seen that a lane boundary may separate adjacent lanes. Each lane may be identified with a lane ID. For example, lane 715 may be identified with a lane ID=1, and lane 717 may be identified with a lane ID=2. Lane 715 may be an ego lane, a lane currently traveled on by an ego vehicle.

In existing approaches, neural networks are trained to predict lane bounding boxes (LBBs) and perform lane marker (LM) segmentation in each predicted box, e.g., to recognize lane instances. While detecting the LBBs is fairly robust, lane marker segmentation is not reliable. Segmentation outputs are often noisy, and thus require post-processing to get clear lane boundaries.

Figure 8:
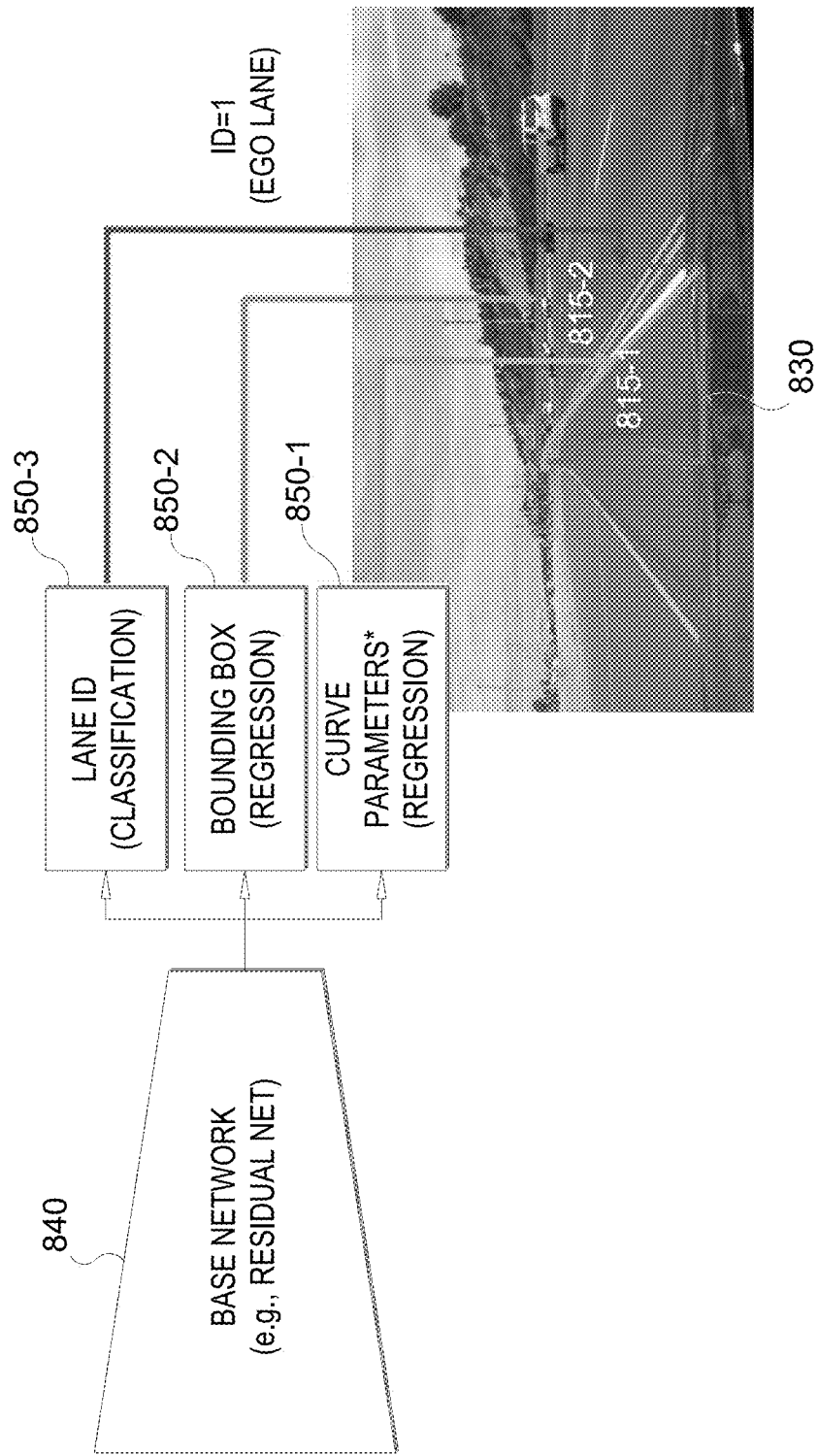
FIG. 8 illustrates an example of combining object detection and parametric curve prediction using a single network, according to aspects of the disclosure.

To address such shortcomings, it is proposed to combine object detection and parametric curve prediction using a single network. FIG. 8 illustrates the proposed concept performed by a system, e.g., of an ego-vehicle. The system may comprise any combination of the architectures of FIGS. 2, 5 and 6. In an aspect, the system includes a neural network (e.g., convolutional neural network) that implements the illustrated concept. The system predicts lane bounding boxes (LBBs) within a camera frame (e.g., a frame from a camera sensor). The camera frame may be monocular camera frame.

FIG. 8 shows a camera frame with one LBB 830. In the proposed technique, a base network 840 extracts features that are used by later parts of the system. The base network 840 can be a layer (or layers) of the system's neural network. On top of the extracted features from the base network 840, the estimation layers 850 are added to infer the desired output, including LBBs, lanes with the LBBs and their identifications. In FIG. 8, three estimation layers 850-1, 850-2, 850-3 (singularly or collectively 850) are shown. However, there can be any number of estimation layers 850. As will be detailed further below, one or more lanes 815 are predicted within the LBB 830. Two lanes 815-1, 815-2 (singularly or collectively 815) are shown to be within the LBB 830. But again, there can be any number of lanes 815 within any particular LBB 830.

Figure 9:
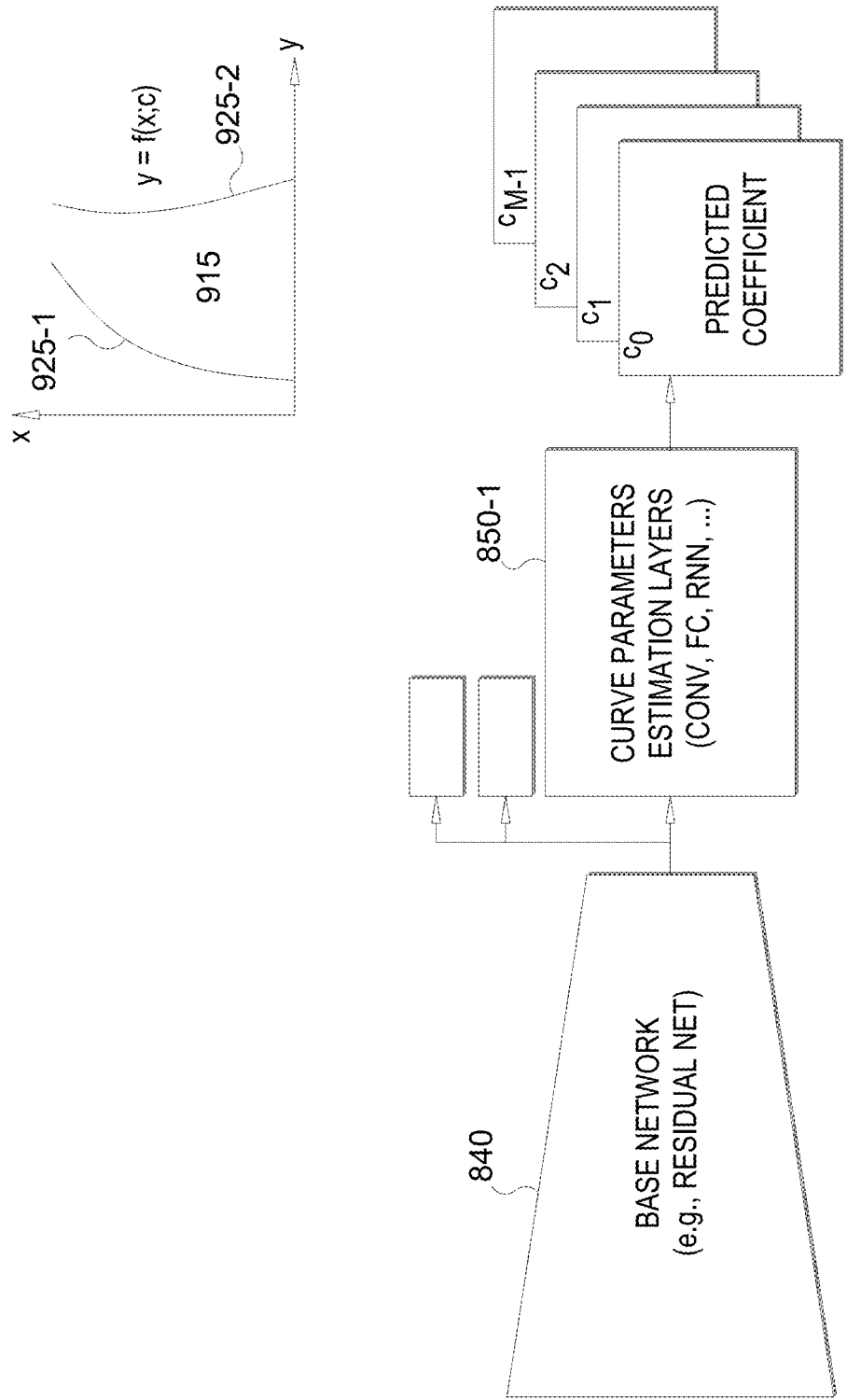
FIG. 9 illustrates an example of curve parameters estimation by estimation layers, according to aspects of the disclosure.

The curve parameters are then predicted for each of the lanes 815. A single curve can be predicted (for lane marker detection) or two curves can be predicted (for lane surface detection). FIG. 9 shows curve parameters for a curve (lane marker / lane boundary) estimated by one or more estimation layers 850. For each curve or lane, M dimensional curve parameters $c=(c_0, c_1, \ldots, c_{M-1})$ corresponding to a curve equation $$y=f(x;c)=c_{M-1}x^{M-1}+c_{M-2}x^{M-2}+\ldots+c_1x+c_0$$

are predicted. The curve parameters $c = (c_0, c_1, \ldots, c_{M-1})$ may also be referred to as a curve vector c. As seen in FIG. 9, examples of curves that can be estimated include lane boundaries (e.g., lane boundaries 925-1, 925-2) and/or lanes 915. The individual elements $c_m$ of the curve vector c represent curve coefficients of the curve polynomial $y = f(x;c)$. The estimation layers 850 can be layers of the neural network (e.g., convolution layers, fully connected layers, recurrent network layers, etc.).

The curve parameter estimation layers 850 can directly infer the curve parameters $c = (c_0, c_1, \ldots, c_{M-1})$. Alternatively, to stabilize the training process, a basic shape of the curve in a left lane—a lane left of the geo lane—can be assumed as being from bottom left to top right, which can be represented with a default $\bar{c}$. In regression, small difference $\Delta c$ are estimated, which are added to the default $\bar{c}$, to arrive at the predicted curve vector c. That is, the small differences $\Delta c$ are estimated such that $c = \bar{c} + \Delta c$.

Regression is performed to determine the M dimensional curve vector c. The curve coefficients $(c_0, c_1, \ldots, c_{M-1})$ are highly correlated with each other. Therefore, defining effective loss function and regression network structure can be significant factors in the performance of the system. There are a number of ways to determine the curve vector c.

In a first way, each coefficient $c_m$, $m = 0, 1, \ldots M-1$ can be independently predicted by a score function $c_m = g_{\theta_m}(x)$ and its parameters $\theta = (\theta_0, \ldots, \theta_{M-1})$ is obtained by optimizing a loss function with a loss weight so that higher order coefficients are given higher weight. In an aspect, loss function may be expressed as:

$$\text{loss} = \Sigma_{m=0}^{M-1} w_m |c_m - \hat{c}_m|,$$

in which $\hat{c}_m$ represents ground truth coefficient and $w_m$ represents loss weight for $c_m$.

In a second way, the parameters $\theta$ can be determined based on a loss(avg) representing loss from average curve distance. In an aspect, loss(avg) may be expressed as:

$$\text{loss}(avg) = \frac{\int_{x_{bottom}}^{x_{top}} (f(x; c) - f(x; \hat{c}))^2 dx}{x_{top} - x_{bottom}}.$$

In a third way, the coefficients $c_m$ are predicted sequentially starting from $c_0$. That is, $c_0$ is first predicted, $c_1$ is predicted after $c_0$, and so on. That is, the higher order coefficient $c_m$ is predicted after the lower order coefficients $c_{m-1}, c_{m-2}, \ldots c_0$ are predicted. The sequential prediction of the coefficients can be performed using a Recurrent Neural Network (RNN).

In a fourth way, regression can be performed on coordinates of sampled points on curves. For example, N horizontal lines can be drawn at uniform intervals in the lane bounding box, and 2D coordinates of the points where the curve and the horizontal line meet can be found. These N points are regressed through the neural network and the curve fitting method is used to obtain the curve parameters.

There are several advantages to the proposed neural network based lane marker detection (LMD) using parametric curve regression. First, another network for lane marker segmentation is not necessary. Second, the features from the base network 840 can be efficiently shared with other object detection tasks in autonomous driving. This means that the single network can perform vehicle detection, traffic sign detection, lane marker detection, and so on. Third, parametric curves can be directly obtained, which reduces the need for post-processing.

Figure 10:
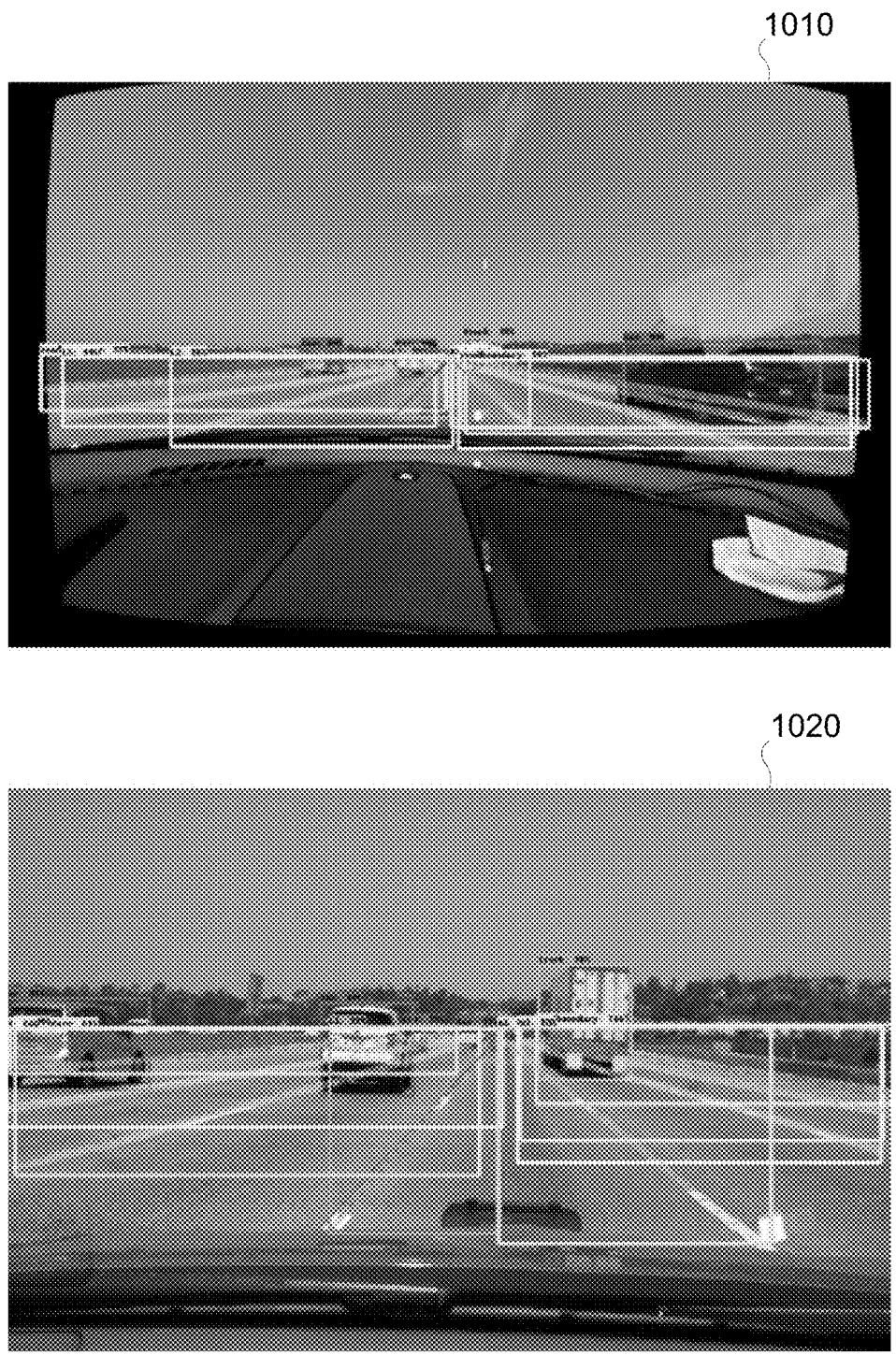
FIG. 10 illustrates exemplary views of a same scene taken by different cameras.

One or more aspects of this disclosure relate to lane instance recognition. Lane instances are often difficult to recognize. This is because they are thin and elongated, and also look different from view to view. As a demonstration, FIG. 10 illustrates difference in the views 1010, 1020 of a same scene taken from different cameras. To address such difficulties, it is proposed to perform lane instance recognition by object detection. The proposed object detection based approach combines local mask segmentation lane estimation with control points lane estimation.

Figure 11:
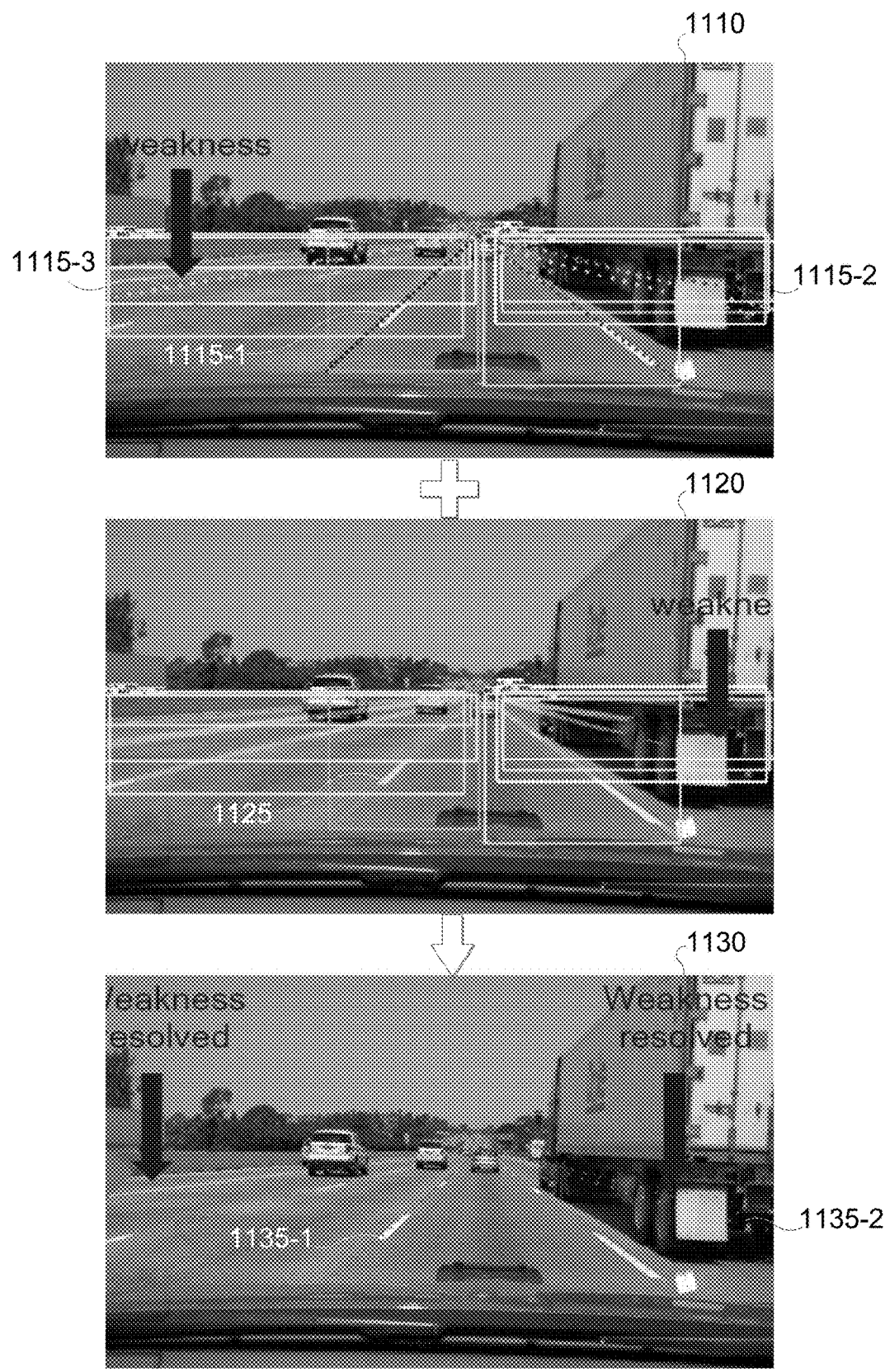
FIG. 11 illustrates example an example application of combining control points lane estimation with local mask segmentation lane estimation, according to aspects of the disclosure.

FIG. 11 illustrates an example combining of control points lane estimation with local mask segmentation lane estimation. An example output of lane estimation through control points lane estimation is shown in image 1110. The lane marker detection using parametric curve detection illustrated in FIGS. 7-10 and described above is an example of control points lane estimation. In image 1110, multiple instances of lane boundaries 1115-1, 1115-2, 1115-3 (singularly or collectively as 1115) are predicted within multiple lane boundary boxes (LBBs) (not numbered so as to reduce clutter). The predicted lane boundaries 1115 are illustrated as dotted lines. Not all predicted lane boundaries are numbered in image 1110 so as to reduce clutter.

A strength of control points lane estimation is its robustness in estimating lanes even when the lane markers (LMs) are occluded. For explanation, note that in the image 1110, even when lane markers are occluded by the truck, the corresponding lane boundary 1115-1 can still be predicted or otherwise estimated. However, control points lane estimation is relatively weak in localization of the lanes. For example, in the image 1110, note the inaccuracy of the predicted/estimated lane boundary 1115-3 with reality.

Local mask segmentation lane estimation is the opposite. That is, local mask segmentation lane estimation is robust when it comes to localizing lanes. However, its performance can degrade when the lane is not visible, such as when there is heavy traffic. An example output of lane estimation through local mask segmentation lane estimation is shown in image 1120 which shows multiple instances of lane boundaries 1125 (only one numbered for clarity) predicted within multiple LBBs (not numbered so as to reduce clutter). The predicted lane boundaries 1125 are illustrated as continuous lines. Not all predicted lane boundaries are numbered in image 1120 so as to reduce clutter.

Note that the inaccurate lane boundary similar to lane boundary 1115-3 in image 1110 is not in image 1120. Other lane boundaries 1125 that are present in image 1120 are relatively accurate with respect to actual lane markers. This indicates that local mask segmentation relatively robust in accurately localizing lane boundaries. However, it is also noted that lanes similar to lane boundaries 1115-2—occluded lane boundaries—are also not predicted in image 1120. That is, local mask segmentation is relatively weak in predicting lane boundaries that are not visible.

As indicated above, it is proposed to combine local mask segmentation lane estimation with control points lane estimation. An example output of the proposed combined approach is shown in image 1130, which shows multiple instances of lane boundaries 1135-1, 1135-2 (singularly or collectively as 1135) are predicted through combining control points estimation with local mask segmentation. The predicted lane boundaries 1135 are illustrated as dotted lines. Not all predicted lane boundaries are numbered in image 1130 so as to reduce clutter. As seen, by combining, the strength of one compensates for the other. That is, occluded lane boundaries are still predicted. Also, lane localization is still relatively accurate. As a result, the system is robust overall.

Figure 12:
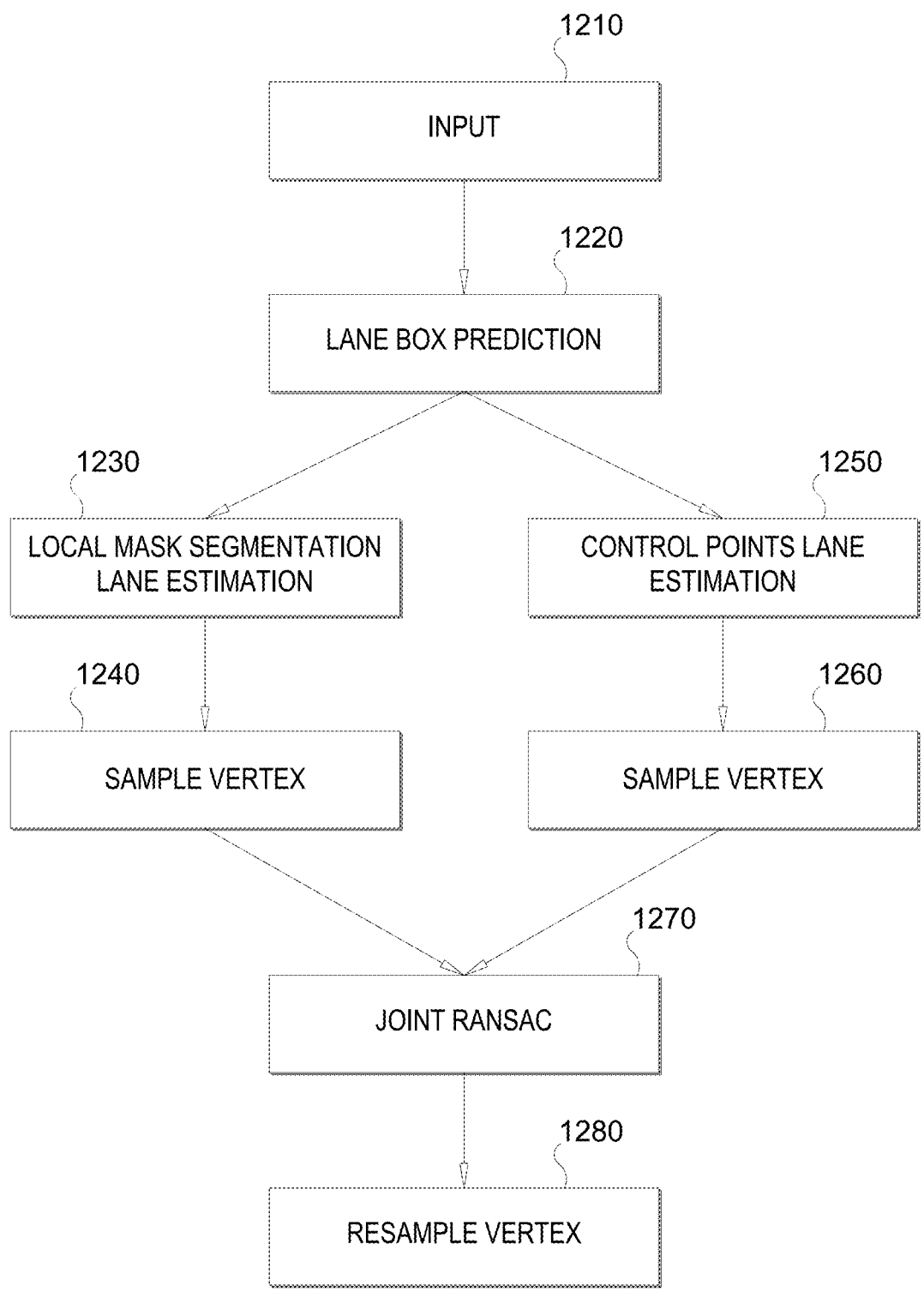
FIG. 12 illustrates example stages of proposed technique(s) for lane instance recognition, according to aspects of the disclosure.

FIG. 12 illustrates example stages of the proposed technique/process, e.g., performed by a system on an ego-vehicle. The system may comprise any combination of the architectures of FIGS. 2, 5 and 6. The proposed technique/process includes the following stages: an input stage 1210, a lane box prediction stage 1220, a local mask segmentation lane estimation stage 1230 followed with a sample vertex stage 1240, a control points lane estimation stage 1250 followed with its sample vertex stage 1260, a joint random sample consensus (RANSAC) stage 1270, and a resample vertex stage 1280.

Figure 13:
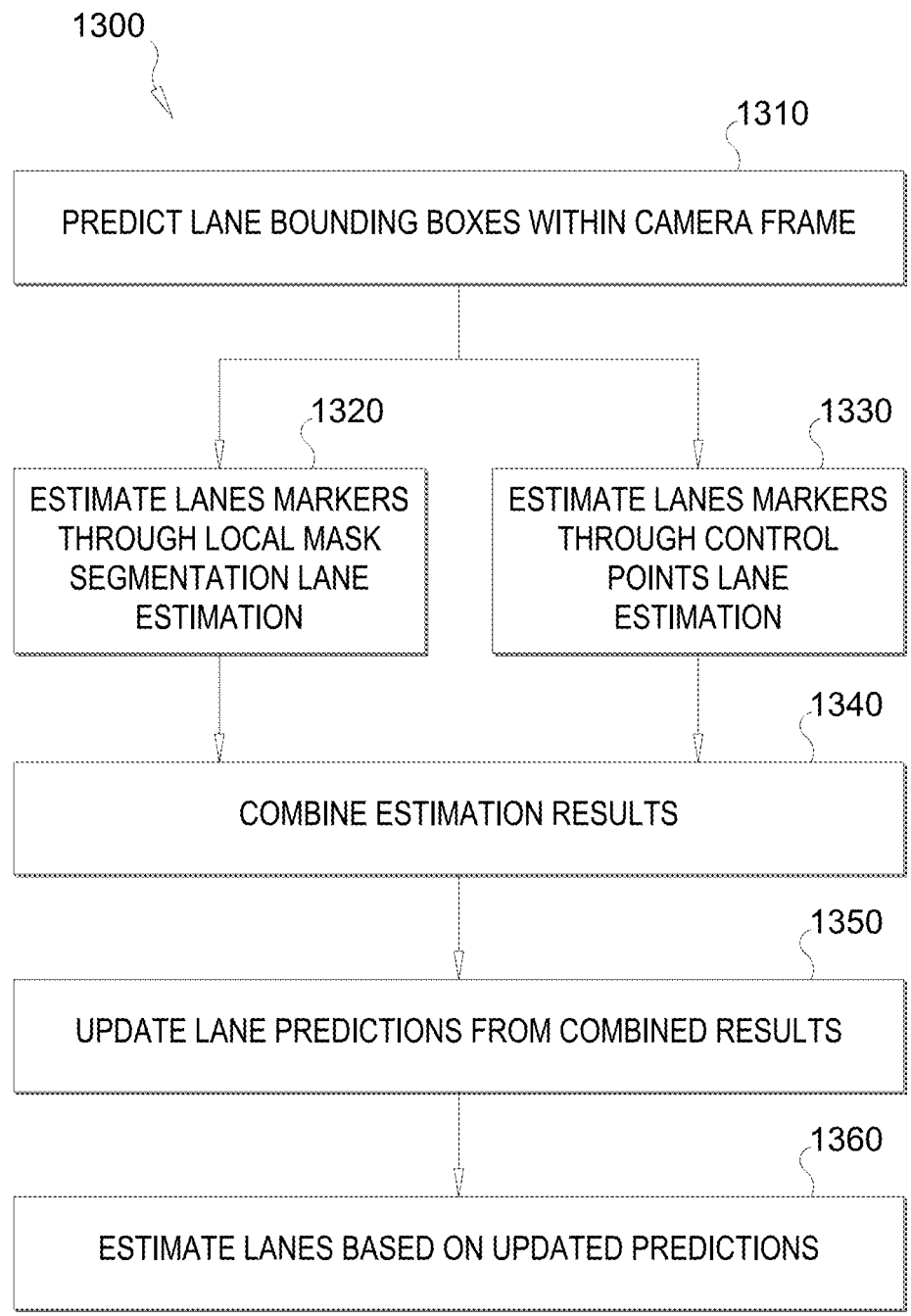
FIG. 13 illustrates a flow chart of an example method for lane instance recognition, according to aspects of the disclosure.

FIG. 13 illustrates a flow chart of an example method 1300 performed by the system to recognize lane instances, i.e., to estimate lanes. For ease of description, a single image, i.e., a single camera frame captured by a single camera sensor is assumed in FIG. 13. In block 1310, the system may predict a lane bounding box (LBB) from an input image, i.e., a camera frame from a camera sensor. The LBB may be one of one or more LBBs predicted by the system in block 1310. As the name suggests, the LBBs define areas of the camera frame predicted by the system to likely include lanes and/or lane boundaries. At least one LBB may be a portion, less than all, of the camera frame. The camera frame may be monocular camera frame. Block 1310 may correspond to the input and lane box prediction stages 1210, 1220 of FIG. 12.

In block 1320, the system may perform local mask segmentation lane estimation on the LBB to estimate one or more lanes and/or lane boundaries within the LBB. When multiple LBBs are predicted in block 310, the system may perform the local mask segmentation lane estimation on at least two LBBs, preferably on all LBBs, in block 1320. Block 1320 may correspond to the local mask segmentation lane estimation stage 1230 and to the connected sample vertex stage 1240 of FIG. 12.

Figure 14:
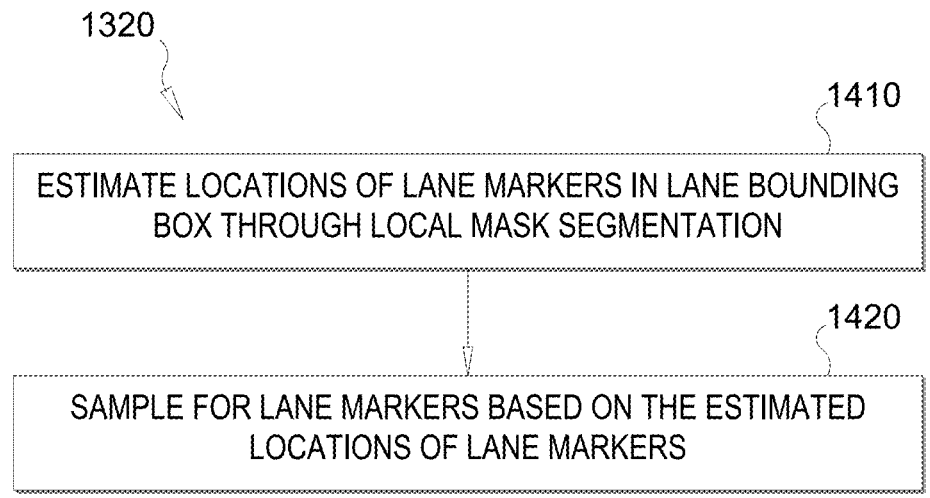
FIG. 14 illustrates a flow chart of an example process for performing local mask segmentation lane estimation, according to aspects of the disclosure.

FIG. 14 illustrates a flow chart of an example process to implement block 1320 of FIG. 13. In block 1410, the system may estimate the locations of lane markers of the one or more lanes in the LBB through local mask segmentation. The locations may be estimated or predicted based on processing of prior camera frames. Recall that clusters of lane markers may define lane boundaries. Thus, it may be said that in block 1410, the system estimates or otherwise predicts lane boundaries in the LBB.

In block 1420, the systems may sample for lane markers of the one or more lanes within the LBB based on the estimated locations of the lane markers. That is, the system may sample for lane markers at points along the estimated lane boundaries. For example, the local mask segmentation may identify one or more pixels in the LBB predicted as belonging to the lane markers. Then coordinates or vertices along the predicted lane markers pixels may be sampled to detect the lane markers themselves. As an illustration, note that the lane markers themselves may be line segments painted on a surface of the road. In general, lane markers may be detected by applying one or more filters (e.g., one-dimensional filter, two-dimensional filter, etc.) on an input image, e.g., on a camera frame. For sampling, the same filter may be applied along the coordinates/vertices of the predicted lane markers. The result of sampling is a collection of estimated 2D (e.g., horizontal, vertical) coordinates or positions of the lane markers.

Referring back to FIG. 13, in block 1330, the system may perform control points lane estimation on the LBB to estimate one or more lanes within the LBB. When multiple LBBs are predicted in block 310, the system may perform the control points lane estimation on at least two LBBs, preferably on all LBBs, in block 1330. Block 1330 may correspond to the control points lane estimation stage 1250 and the connected sample vertex stage 1260 of FIG. 12.

Figure 15:
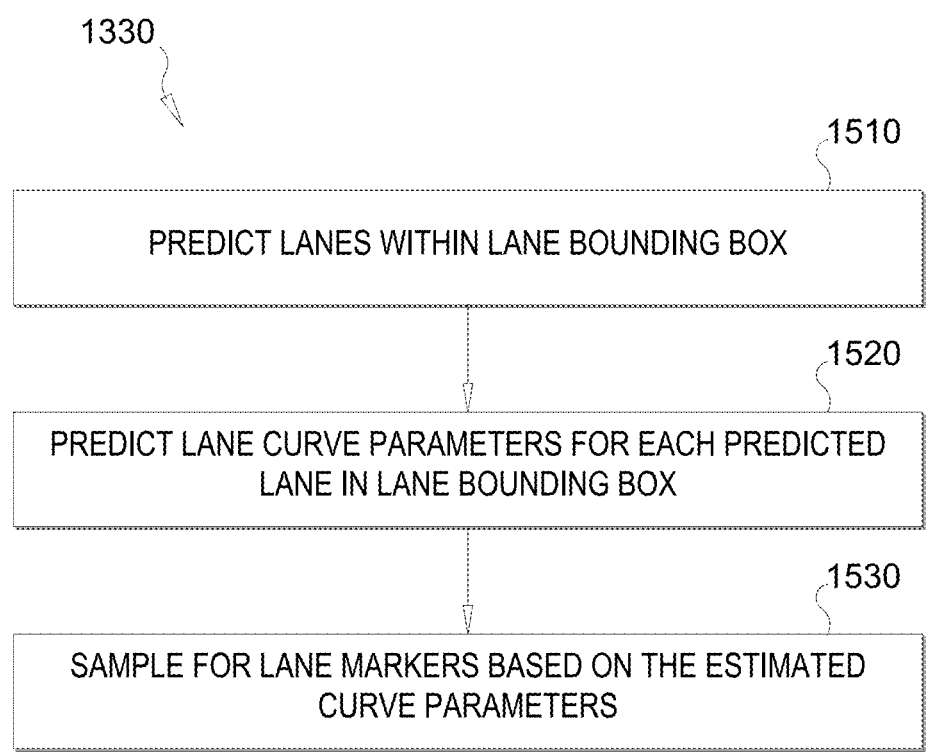
FIG. 15 illustrates a flow chart of an example process for performing control points lane estimation, according to aspects of the disclosure.

FIG. 15 illustrates a flow chart of an example process to implement block 1330 of FIG. 13. As indicated, the lane marker detection using parametric curve detection described above is an example of control points lane estimation. In block 1510, the system may predict, i.e., estimate, the one or more lanes within the LBB. Each lane may be identified by a lane ID. For example, ego lane may be identified as ID=1, lane immediately right may be identified as ID=2, and so on. Recall that since lanes are defined by adjacent lane boundaries, block 1510 may entail predicting one or more lane boundaries. Thus, block 1510 may be more generally viewed as predicting one or more curves (each curve being a lane or a lane boundary).

In block 1520, for each predicted lane and/or lane boundary within the LBB, the system may predict a plurality of curve parameters. That is, for at least one predicted lane and/or lane boundary (represented as a curve), the M dimensional curve parameters $c=(c_0, c_1, \ldots, c_{M-1})$ may be predicted (see FIG. 9). The curve parameters may be predicted for each predicted curve. Recall that there can be multiple ways to predict the curve parameters. For example, each curve coefficient can be predicted by the score function and its parameters obtained by optimizing through a loss function with a loss weight so that higher order coefficients are given higher weight. As another example, the parameters can be determined based on a loss(avg) representing loss from average curve distance. As a further example, RNN can be used to sequentially determine the coefficients. As another further example, regression can be performed on coordinates of sampled points on curves.

Figure 16:
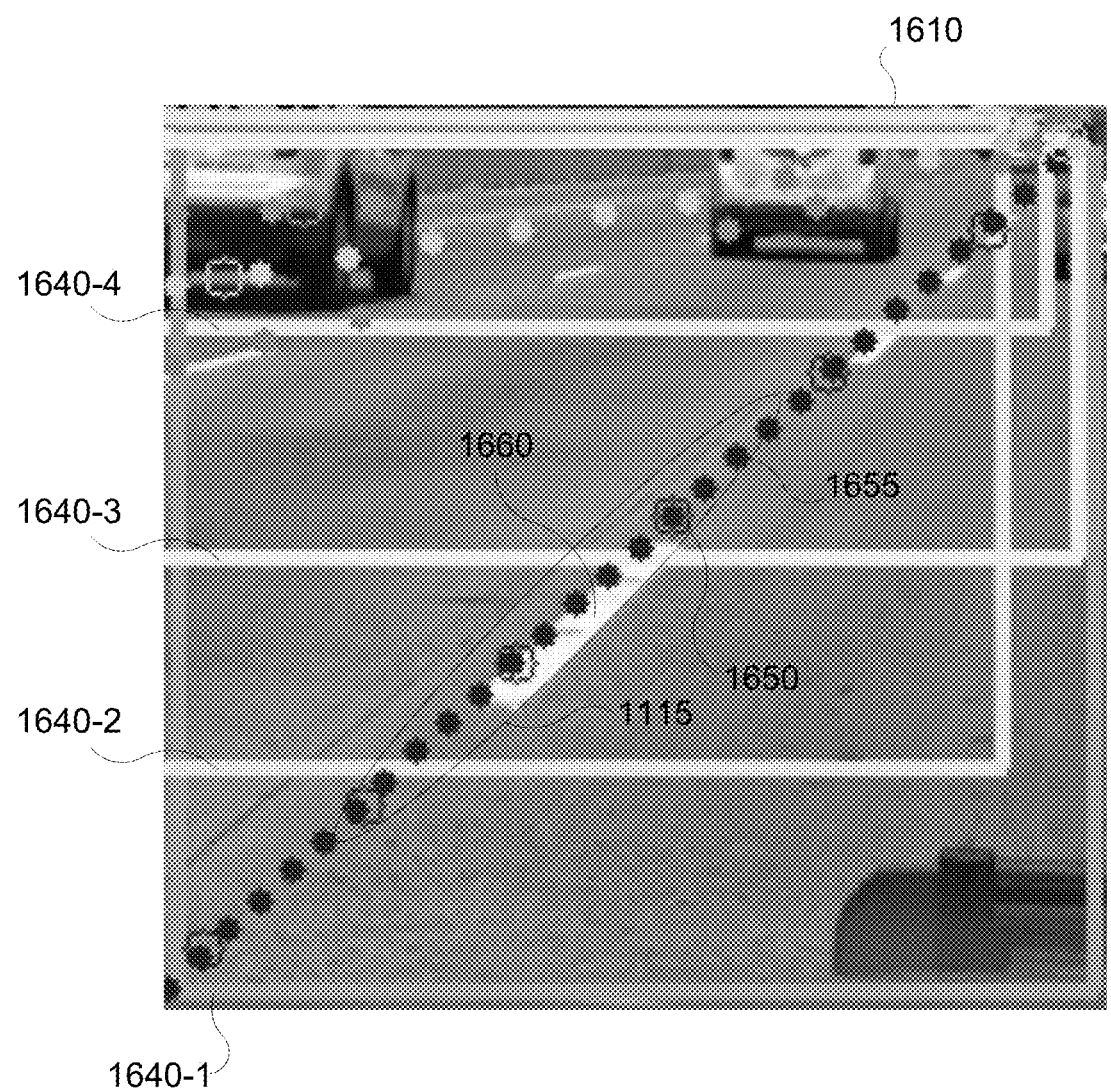
FIG. 16 illustrates sampling along vertices, according to aspects of the disclosure.

In block 1530, the systems samples for lane markers based on the predicted curve parameters. For example, one or more filters (similar to sampling described above with respect to block 1420) may be applied along the coordinates/vertices corresponding to the predicted curve parameters. For illustration purposes, FIG. 16 shows a magnified view 1610 one of the lane bounding boxes of image 1110. In view 1610, partial views of LBBs 1640-1, 1640-2, 1640-3, 1640-4 (singularly or collectively 1640) predicted by the system in block 1310 are shown (LBBs not numbered in FIG. 11). Also shown is the predicted lane boundary 1115 illustrated as a dotted line.

In FIG. 16, the circled dots 1650 of the predicted lane boundary 1115 indicate estimated coordinates of sampled points on curves. By using curve fitting method with the sampled points, the M dimensional curve parameters $c=(c_0, c_1, \ldots, c_{M-1})$ are estimated in block 1520. The solid points 1655 indicate sampling coordinates for block 1530. In other words, these sampling coordinates 1655 are processed to determine whether each sampling coordinate 1655 is part of a lane marker 1660. Again, the result of sampling is a collection of estimated 2D (e.g., horizontal, vertical) coordinates or positions of the lane markers.

Referring back to FIG. 13, in block 1340, the system combines the estimation results of the local mask segmentation lane estimation and of the control points lane estimation. The local mask segmentation lane estimation results and the control points lane estimation results are projected in a same space.

In block 1350, the system updates the lane predictions from the combined results. In an aspect, the lane predictions are updated by applying random sample consensus (RANSAC) to the combined results to reject the outliers. Note that in general, outputs of RANSAC are models that are "good fits" to most input data. In this instance, the combined result is provided as inputs to RANSAC. In other words, the local mask segmentation lane estimations and the control points lane estimations are provided as inputs to RANSAC. Thus, in an aspect, the outputs from RANSAC are updated predictions of lanes that fit the inlier data points of the combined result. Block 1350 may correspond to the joint RANSAC stage 1270 of FIG. 12. This stage can be more generally referred to as outlier rejection stage.

In block 1360, the system performs the lane estimation based on the updated lane predictions. Having rejected outliers, the estimation based on updated predictions should be more accurate than estimations through local mask segmentation alone or through control points estimation alone. In an aspect, the system can sample for lane markers based on the updated lane predictions. In particular, coordinates or vertices along the updated lane predictions may be sampled to detect the lane markers themselves. For example, one or more filters (similar to sampling described above with respect to block 1420) may be applied along the coordinates/vertices corresponding to the updated lane predictions. Block 1360 may correspond to the resample vertex stage 1280 of FIG. 12. The end result is that the weaknesses of the local mask segmentation lane estimation and the control points lane estimation techniques are compensated for, and the system is more robust overall.

Recall that in the method 1300 of FIG. 13, local mask segmentation and control points lane estimation were performed on a same camera frame. However, it is also contemplated that the camera frames for local mask segmentation and control points lane estimation need not be the same. In other words, different camera frames (e.g., first and second camera frames from first and second cameras) may be used. Whether a single camera frame or multiple camera frames are used, there can be advantages and disadvantages to both. For example, a greater flexibility may be available when two different camera frames (captured by two different cameras) are used. On the other hand, when a single camera frame is used, then there would be no need to calibrate the multiple cameras.

Figure 17:
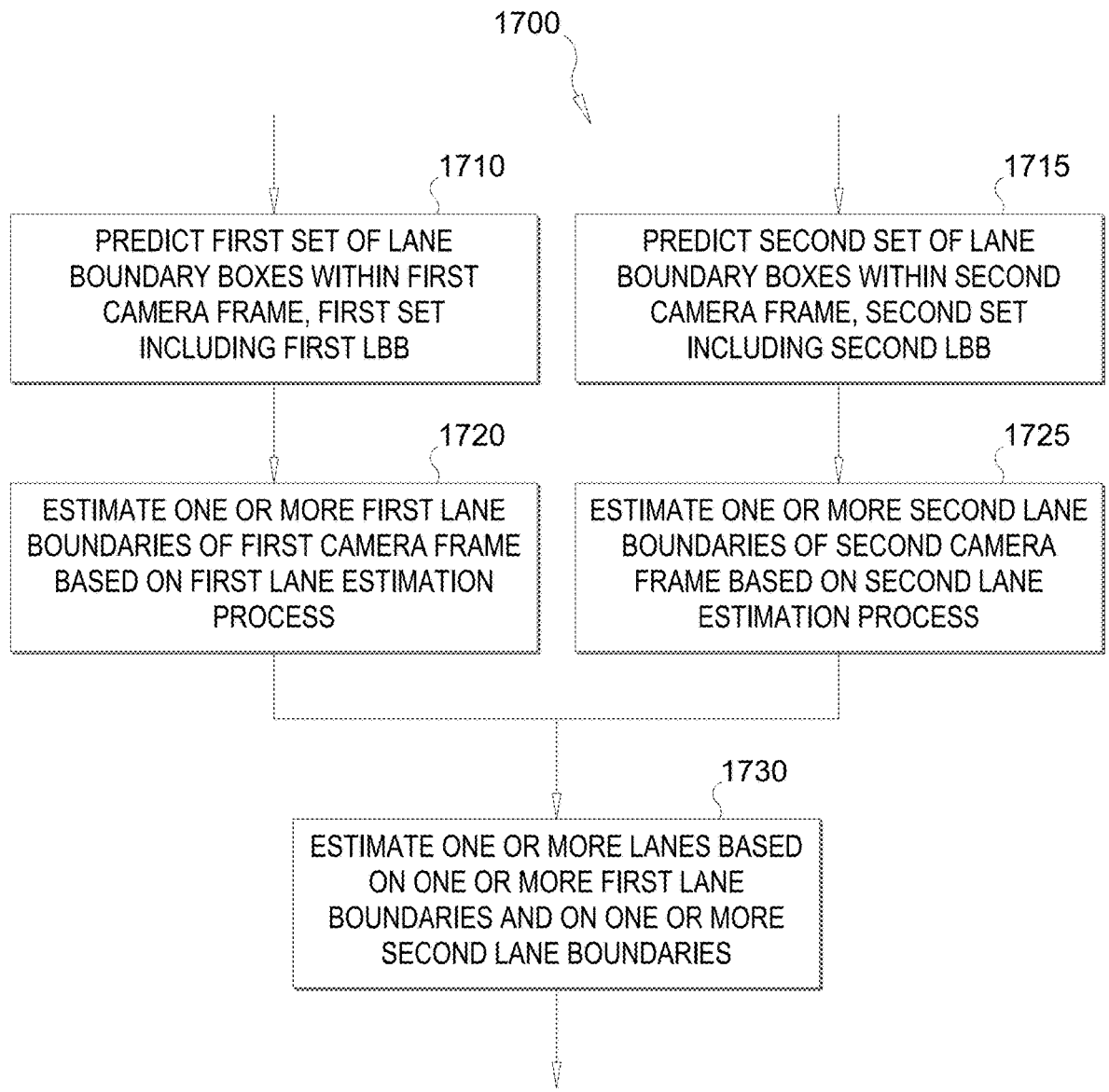
FIGS. 17-19 illustrate flow charts of another method for lane instance recognition, according to aspects of the disclosure.

FIG. 17 illustrates a flow chart of an example method 1700 performed by the system to estimate one or more lane boundaries in one or more camera frames. The method 1700 may be viewed as a more general form of the method 1300. In block 1710, the system may predict a first set of one or more lane boundary boxes (LBBs) within a first camera frame. The first set may include a first LBB. The LBBs of the first set, including the first LBB, may be predicted based on one or more prior camera frames. The LBBs of the first set may be predicted such that for each predicted LBB within the first camera frame, a likelihood of one or more lane markers and/or boundaries being within the predicted LBB is at least a first likelihood threshold. Also the first set of LBBs may be predicted such that entirety of the first camera frame need not be processed. For example, the first LBB may be less than an entirety of the first camera frame.

Figure 18A:
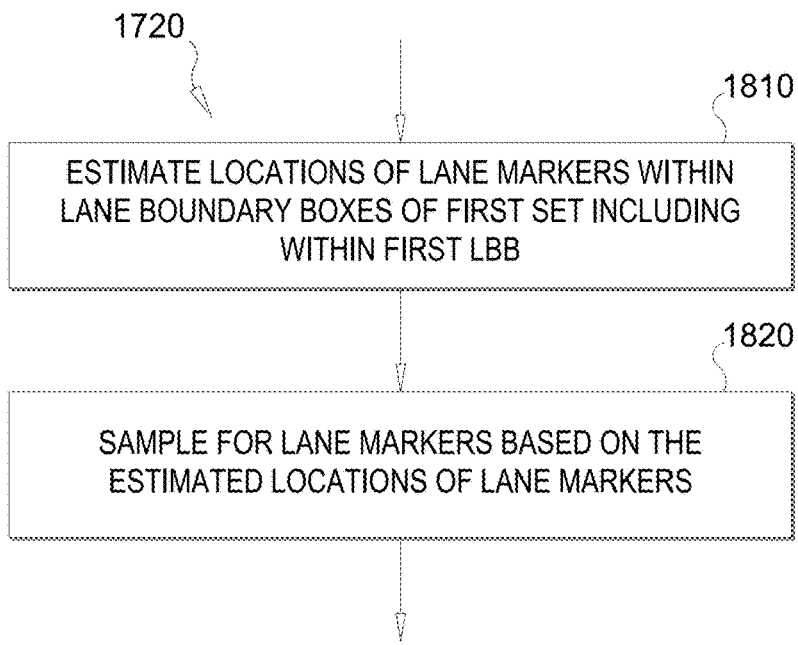

In block 1720, the system may estimate one or more first lane boundaries of a first camera frame based on a first lane estimation process. FIG. 18A illustrates a flow chart of an example of the first lane estimation process to implement block 1720. In this instance, the first lane estimation process is assumed to be the local mask segmentation estimation process (see also FIG. 14). In block 1810, the system may predict or otherwise estimate locations of lane markers within the LBBs of the first set including the locations of lane markers within the first LBB. The locations may be estimated based on processing of one or more camera frames prior to the first camera frame.

In block 1820, the systems may sample for lane markers of the LBBs of the first set based on the estimated locations of the lane markers. For example, at estimated locations of the first camera frame, filtering may be applied to determine whether or not a lane marker is actually present. The one or more first lane boundaries may comprise one or more lane boundaries corresponding to the sampled LMs within the LBBs of the first set, including within the first LBB.

Referring back to FIG. 17, in block 1715, the system may predict a second set of one or more LBBs within a second camera frame. The second set may include a second LBB. The LBBs of the second set, including the second LBB, may be predicted based on one or more prior camera frames. The LBBs of the second set may be predicted such that for each predicted LBB within the second camera frame, a likelihood of one or more lane markers and/or boundaries being within the predicted LBB is at least a second likelihood threshold. Also the second set of LBBs may be predicted such that entirety of the second camera frame need not be processed. For example, the first second may be less than an entirety of the first camera frame.

Figure 18B:
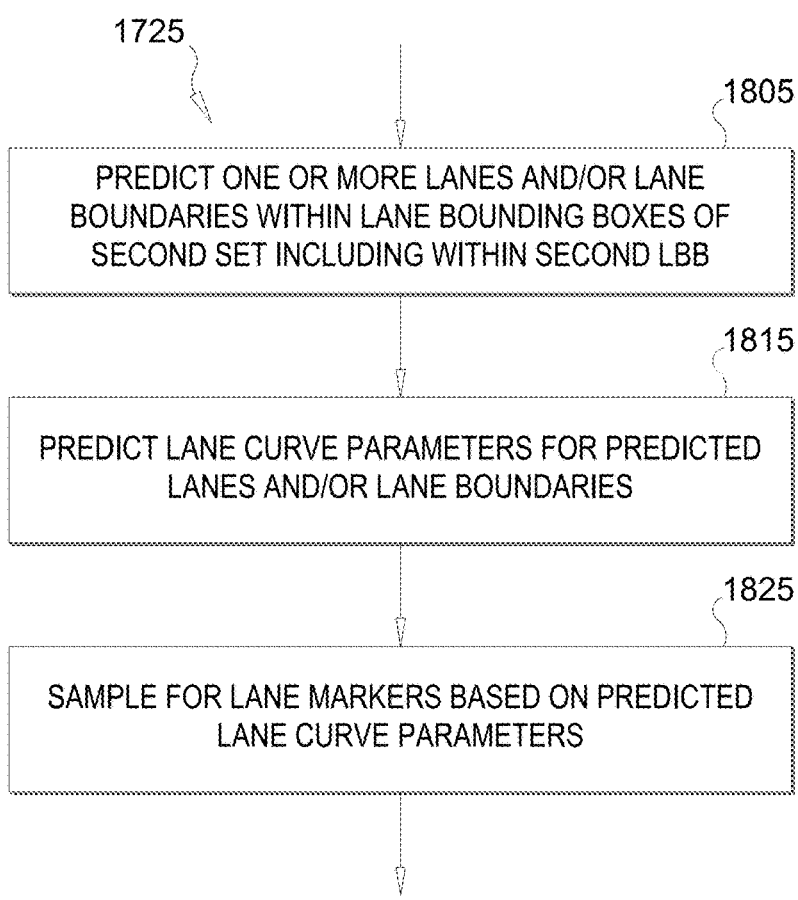

In block 1725, the system may estimate one or more second lane boundaries of a second camera frame based on a second lane estimation process. FIG. 18B illustrates a flow chart of an example of the second lane estimation process to implement block 1725. In this instance, the second lane estimation process is assumed to be the control points estimation process (see also FIG. 15). In block 1805, the system may predict or otherwise estimate one or more lanes and/or lane boundaries, i.e., estimate curves, within the LBBs of the second set including lanes and/or lane boundaries within the second LBB. The lanes and/or the lane boundaries may be estimated based on processing of one or more camera frames prior to the second camera frame.

In block 1815, the system may predict a plurality of curve parameters for each of the predicted curves (i.e., predicted lanes and/or lane boundaries). That is, for at least one predicted curve (e.g., lane or a lane boundary), the M dimensional curve parameters $c=(c_0, c_1, \ldots, c_{M-1})$ may be predicted (see FIG. 9). Possible ways to predict the curve parameters have been discussed above. In block 1825, the system may sample for lane markers based on the predicted curve parameters. For example, at locations of the second camera frame corresponding to the predicted curve parameters, filtering may be applied to determine whether or not a lane marker is actually present. The one or more second lane boundaries may comprise one or more lane boundaries corresponding to the sampled LMs within the LBBs of the second set, including within the second LBB.

Figure 19:
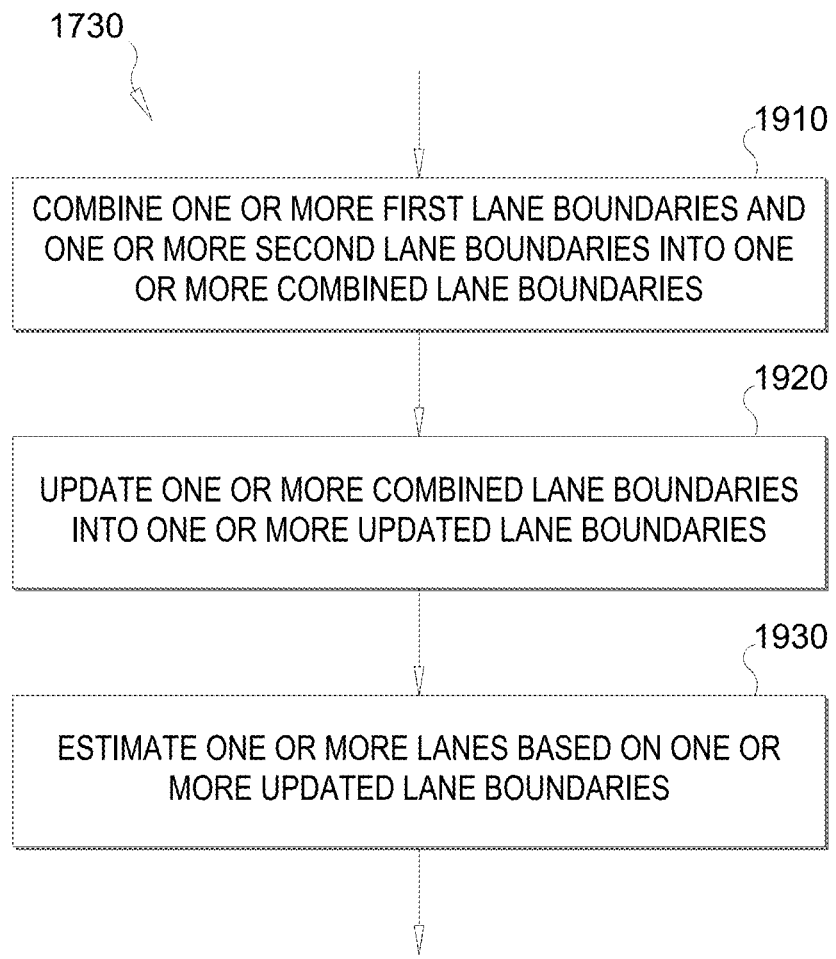

Referring back to FIG. 17, in block 1730, the system may estimate one or more lanes based on the one or more first lane boundaries and on the one or more second lane boundaries. Again, estimating lanes may also entail estimating lane boundaries. FIG. 19 illustrates a flow chart of an example of a process to implement block 1730. In block 1910, the system may combine the one or more first lane boundaries and one or more second lane boundaries into one or more combined lane boundaries (see block 1340). More generally, the system may combine results of first and second estimation processes (e.g., local mask segmentation estimation and control points estimation).

Recall that one advantage of combining is that weaknesses of one estimation process can be compensated by strengths of other estimation process. In this regard, it may be desirable to calibrate the first and second camera frames so as to overlap, at least partially. It may be further desirable to have the overlap be in a common perspective, e.g., a common spatial domain. Then at least one LBB of the first set, e.g., the first LBB, may overlap with at least one LBB of the second set, e.g., the second LBB. Then within the overlap, the weakness of one process can be compensated by strength of the other process. When the first and second frames are the same, then no calibration would be needed. Also, when the first and second LBBs are the same, then the compensation advantage can be taken fully.

In block 1920, the system may update the one or more combined lane boundaries into one or more updated lane boundaries. That is, the system may update lane predictions. In this block, the system may reject outliers. For example, outlier lane boundaries of the one or more combined lane boundaries may be rejected. The one or more updated lane boundaries may comprises the remaining lane boundaries of the one or more combined lane boundaries. The outliers may be rejected through RANSAC process described above.

In block 1930, the system may estimate the one or more lanes based on the one or more updated lane boundaries. For example, the system may sample for lane markers based on the one or more updated lanes. In particular, coordinates or vertices along the one or more updated lanes may be sampled to detect the lane markers themselves.

When the first and second cameras are the same and the first and second LBBs are the same, then blocks 1340, 1350, 1360 may be an example implementation of block 1730

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying the methods described herein.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of estimating lanes, the method comprising:
   estimating one or more first lane boundaries of a first camera frame based on a local mask segmentation estimation process;
   estimating one or more second lane boundaries of a second camera frame based on a control points estimation process; and
   estimating one or more lanes based on the one or more first lane boundaries and the one or more second lane boundaries,
   wherein the local mask segmentation estimation process and the control points estimation process are different processes,
   wherein inputs to the local mask segmentation estimation process are not based on outputs from the control points estimation process, and
   wherein inputs to the control points estimation process are not based on outputs from the local mask segmentation estimation process.

2. The method of claim 1, wherein at least one first lane boundary and at least one second lane boundary are the same.

3. The method of claim 1, further comprising:
predicting a first set of one or more lane boundary boxes (LBBs) within the first camera frame prior to estimating the one or more first lane boundaries, the first set including a first LBB; and
predicting a second set of one or more lane boundary boxes (LBBs) within the second camera frame prior to estimating the one or more second lane boundaries, the second set including a second LBB.

4. The method of claim 3,
wherein the first and second camera frames are the same, and
wherein the first LBB overlaps, at least in part, with the second LBB.

5. The method of claim 4, wherein the first and second LBBs are the same.

6. The method of claim 3,
wherein the first LBB is less than an entirety of the first camera frame, and/or
wherein the second LBB is less than an entirety of the second camera frame.

7. The method of claim 3, wherein estimating the one or more first lane boundaries of the first camera frame based on the local mask segmentation estimation process comprises:
estimating locations of one or more lane markers (LMs) within the first LBB based on processing of one or more camera frames prior to the first camera frame; and
sampling for LMs within the first LBB based on the estimated LM locations,
wherein the one or more first lane boundaries comprise one or more lane boundaries corresponding to the one or more LMs sampled within the first LBB.

8. The method of claim 7, wherein the locations of the one or more LMs are estimated based on one or more camera frames prior to the first camera frame.

9. The method of claim 3, wherein estimating the one or more second lane boundaries of the second camera frame based on the control points estimation process comprises:
predicting one or more lane boundaries within the second LBB based on processing of one or more camera frames prior to the second camera frame;
predicting a plurality of curve parameters of at least one predicted second lane boundary; and
sampling for lane markers (LMs) within the second LBB based on the plurality of curve parameters,
wherein the one or more second lane boundaries comprise one or more lane boundaries corresponding to the one or more LMs sampled within the second LBB.

10. The method of claim 9, wherein regression is performed to predict the curve parameters of the at least one predicted lane boundary.

11. The method of claim 3, wherein estimating the one or more lanes comprises:
combining the one or more first lane boundaries and the one or more second lane boundaries into one or more combined lane boundaries;
updating the one or more combined lane boundaries into one or more updated lane boundaries; and
estimating the one or more lanes based on the updated one or more lane boundaries.

12. The method of claim 11,
wherein updating the one or more lane combined lane boundaries comprises rejecting outliers from the one or more combined lane boundaries; and wherein estimating the one or more lanes based on the updated one or more lane boundaries comprises sampling for lane markers (LMs) based on the updated one or more lane boundaries.

13. The method of claim 12, wherein rejecting the outliers in the same LBB comprises performing random sample consensus (RANSAC) on the one or more combined lane boundaries.

14. The method of claim 11,
wherein the first and second camera frames are the same camera frame and the first and second LBBs are the same LBB,
wherein the same LBB is one of a plurality of LBBs predicted within the same camera frame,
wherein the local mask segmentation estimation process is performed on each LBB of the plurality of LBBs,
wherein the control points estimation process is performed on each LBB of the plurality of LBBs, and
wherein for each LBB, the results of the local mask segmentation estimation process and of the control points estimation process are combined, the lane boundaries of the combined result are updated, and lane estimation based on the updated lane boundaries is performed.

15. An apparatus, comprising:
a memory; and
a processor communicatively coupled to the memory,
wherein the memory and/or the processor are configured to:
estimate one or more first lane boundaries of a first camera frame based on a local mask segmentation estimation process;
estimate one or more second lane boundaries of a second camera frame based on a control points estimation process; and
estimate one or more lanes based on the one or more first lane boundaries and the one or more second lane boundaries,
wherein the local mask segmentation estimation process and the control points estimation process are different processes,
wherein inputs to the local mask segmentation estimation process are not based on outputs from the control points estimation process, and
wherein inputs to the control points estimation process are not based on outputs from the local mask segmentation estimation process.

16. The apparatus of claim 15, wherein at least one first lane boundary and at least one second lane boundary are the same.

17. The apparatus of claim 15, wherein the memory and/or the processor are further configured to:
predict a first set of one or more lane boundary boxes (LBBs) within the first camera frame prior to estimating the one or more first lane boundaries, the first set including a first LBB; and
predict a second set of one or more lane boundary boxes (LBBs) within the second camera frame prior to estimating the one or more second lane boundaries, the second set including a second LBB.

18. The apparatus of claim 17,
wherein the first and second camera frames are the same, and
wherein the first LBB overlaps, at least in part, with the second LBB.

19. The apparatus of claim 18, wherein the first and second LBBs are the same.

20. The apparatus of claim 17,
wherein the first LBB is less than an entirety of the first camera frame, and/or
wherein the second LBB is less than an entirety of the second camera frame.

21. The apparatus of claim 17,
wherein to estimate the one or more first lane boundaries of the first camera frame based on the local mask segmentation estimation process, the memory and/or the processor are further configured to:
estimate locations of one or more lane markers (LMs) within the first LBB based on processing of one or more camera frames prior to the first camera frame; and
sample for LMs within the first LBB based on the estimated LM locations, and
wherein the one or more first lane boundaries comprise one or more lane boundaries corresponding to the one or more LMs sampled within the first LBB.

22. The apparatus of claim 21, wherein the memory and/or the processor are configured to estimate the locations of the one or more LMs based on one or more camera frames prior to the first camera frame.

23. The apparatus of claim 17,
wherein to estimate the one or more second lane boundaries of the second camera frame based on the control points estimation process, the memory and/or the processor are further configured to:
predict one or more lane boundaries within the second LBB based on processing of one or more camera frames prior to the second camera frame;
predict a plurality of curve parameters of at least one predicted second lane boundary; and
sample for lane markers (LMs) within the second LBB based on the plurality of curve parameters, and
wherein the one or more second lane boundaries comprise one or more lane boundaries corresponding to the one or more LMs sampled within the second LBB.

24. The apparatus of claim 23, wherein the memory and/or the processor are configured to perform regression to predict the curve parameters of the at least one predicted lane boundary.

25. The apparatus of claim 17, wherein to estimate the one or more lanes, the memory and/or the processor are configured to:
combine the one or more first lane boundaries and the one or more second lane boundaries into one or more combined lane boundaries;
update the one or more combined lane boundaries into one or more updated lane boundaries; and
estimate the one or more lanes based on the updated one or more lane boundaries.

26. The apparatus of claim 25, wherein the memory and/or the processor are configured to:
update the one or more lane combined lane boundaries by rejecting outliers from the one or more combined lane boundaries; and
estimate the one or more lanes based on the updated one or more lane boundaries by sampling for lane markers (LMs) based on the updated one or more lane boundaries.

27. The apparatus of claim 26, wherein the memory and/or the processor are configured to reject the outliers in the same LBB by performing random sample consensus (RANSAC) on the one or more combined lane boundaries.

28. The apparatus of claim 25,
wherein the first and second camera frames are the same camera frame and the first and second LBBs are the same LBB,
wherein the same LBB is one of a plurality of LBBs predicted within the same camera frame,
wherein the memory and/or the processor are configured to:
perform the local mask segmentation estimation process on each LBB of the plurality of LBBs;
perform the control points estimation process on each LBB of the plurality of LBBs, and
for each LBB, combine the results of the local mask segmentation estimation process and of the control points estimation process, update the lane boundaries of the combined result, and perform lane estimation based on the updated lane boundaries.

29. An apparatus, comprising:
means for estimating one or more first lane boundaries of a first camera frame based on a local mask segmentation estimation process;
means for estimating one or more second lane boundaries of a second camera frame based on a control points estimation process; and
means for estimating one or more lanes based on the one or more first lane boundaries and the one or more second lane boundaries,
wherein the local mask segmentation estimation process and the control points estimation process are different processes, and
wherein inputs to the local mask segmentation estimation process are not based on outputs from the control points estimation process and inputs to the control points estimation process are not based on outputs from the local mask segmentation estimation process.

30. A non-transitory computer-readable medium storing computer-executable instructions for an apparatus, the computer-executable instructions comprising:
one or more instructions causing the apparatus to estimate one or more first lane boundaries of a first camera frame based on a local mask segmentation estimation process;
one or more instructions causing the apparatus to estimate one or more second lane boundaries of a second camera frame based on a control points estimation process; and
one or more instructions causing the apparatus to estimate one or more lanes based on the one or more first lane boundaries and the one or more second lane boundaries,
wherein the local mask segmentation estimation process and the control points estimation process are different processes,
wherein inputs to the local mask segmentation estimation process are not based on outputs from the control points estimation process, and
wherein inputs to the control points estimation process are not based on outputs from the local mask segmentation estimation process.

* * * * *